United States Patent
Chae et al.

(10) Patent No.: US 11,222,158 B2
(45) Date of Patent: Jan. 11, 2022

(54) METHOD AND COMPUTING SYSTEM FOR MANUFACTURING INTEGRATED CIRCUIT INCLUDING NANOSHEET

(71) Applicant: Samsung Electronics Co., Ltd., Suwon-si (KR)

(72) Inventors: Jungkyu Chae, Seoul (KR); Jinwoo Jeong, Suwon-si (KR); Kwanyoung Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/034,634

(22) Filed: Sep. 28, 2020

(65) Prior Publication Data

US 2021/0165946 A1 Jun. 3, 2021

(30) Foreign Application Priority Data

Nov. 29, 2019 (KR) .......................... 10-2019-0157686

(51) Int. Cl.
| | |
|---|---|
| *G06F 30/392* | (2020.01) |
| *G06F 30/3312* | (2020.01) |
| *H01L 29/06* | (2006.01) |
| *G06F 119/12* | (2020.01) |
| *H01L 29/786* | (2006.01) |
| *G06F 119/18* | (2020.01) |
| *H01L 29/423* | (2006.01) |

(52) U.S. Cl.
CPC ........ *G06F 30/392* (2020.01); *G06F 30/3312* (2020.01); *G06F 2119/12* (2020.01); *G06F 2119/18* (2020.01); *H01L 29/0673* (2013.01); *H01L 29/42392* (2013.01); *H01L 29/78696* (2013.01)

(58) Field of Classification Search
USPC ........................................................ 716/113
See application file for complete search history.

(56) References Cited

U.S. PATENT DOCUMENTS

| | | | |
|---|---|---|---|
| 7,383,522 | B2 | 6/2008 | Murgai et al. |
| 8,028,267 | B2 | 9/2011 | Izuha |
| 8,631,366 | B2 | 1/2014 | Hou et al. |
| 8,949,765 | B2 | 2/2015 | Buck et al. |
| 9,438,242 | B2 | 9/2016 | Jarrar et al. |
| 9,892,220 | B2 | 2/2018 | Frederick et al. |
| 10,360,334 | B2 | 7/2019 | Jain et al. |
| 2018/0032658 | A1 | 2/2018 | Ha et al. |
| 2018/0210421 | A1 | 7/2018 | Kim et al. |
| 2018/0314771 | A1 | 11/2018 | Lee et al. |
| 2018/0365364 | A1* | 12/2018 | Kim .................. G03F 1/70 |
| 2020/0105761 | A1* | 4/2020 | Liaw .............. H01L 21/823821 |
| 2021/0074697 | A1* | 3/2021 | Baek .................. H01L 29/0673 |
| 2021/0104463 | A1* | 4/2021 | Lee .................. G06F 30/3953 |
| 2021/0104508 | A1* | 4/2021 | Lee .................. G06F 30/39 |
| 2021/0104611 | A1* | 4/2021 | Yu .................. H01L 29/66795 |

* cited by examiner

*Primary Examiner* — Mohammed Alam
(74) *Attorney, Agent, or Firm* — Myers Bigel, P.A.

(57) ABSTRACT

A method of manufacturing an integrated circuit includes: generating layout data of the integrated circuit by placing and routing standard cells that define the integrated circuit, the standard cells including a nanosheet; generating timing analysis data by performing a timing analysis of the integrated circuit using the layout data; and regenerating the layout data of the integrated circuit by replacing and rerouting the standard cells that define the integrated circuit based on the timing analysis data and a shape of the nanosheet of the placed standard cells.

20 Claims, 16 Drawing Sheets

| Factor | | Right Side | | | |
|---|---|---|---|---|---|
| | | Cell 1 | Cell 2 | Cell 3 | Cell 4 |
| Left Side | Cell 1 | a11 | a12 | a13 | a14 |
| | Cell 2 | a21 | a22 | a23 | a24 |
| | Cell 3 | a31 | a32 | a33 | a34 |
| | Cell 4 | a41 | a42 | a43 | a44 |

| Factor | | Right Side | | | |
|---|---|---|---|---|---|
| | | nanosheet 1 | nanosheet 2 | nanosheet 3 | nanosheet 4 |
| Left Side | nanosheet 1 | a11' | a12' | a13' | a14' |
| | nanosheet 2 | a21' | a22' | a23' | a24' |
| | nanosheet 3 | a31' | a32' | a33' | a34' |
| | nanosheet 4 | a41' | a42' | a43' | a44' |

METHOD AND COMPUTING SYSTEM FOR MANUFACTURING INTEGRATED CIRCUIT INCLUDING NANOSHEET

CROSS-REFERENCE TO RELATED APPLICATION

This application claims the benefit of Korean Patent Application No. 10-2019-0157686, filed on Nov. 29, 2019, in the Korean Intellectual Property Office, the disclosure of which is incorporated herein by reference in its entirety.

BACKGROUND

The inventive concept relates to integrated circuits, and, more particularly, to methods and computing systems for manufacturing integrated circuits including nanosheets.

An integrated circuit may be designed based on standard cells. Specifically, a layout of the integrated circuit may be generated by placing the standard cells according to data that defines the integrated circuit and routing between the placed standard cells. Recently, as the configuration of integrated circuits has become more complicated and semiconductor manufacturing processes have become increasingly miniaturized, a large number of semiconductor devices are integrated in the integrated circuit. According to the miniaturization of the semiconductor manufacturing processes, the standard cells including patterns formed in a plurality of layers may include patterns of reduced size, and a size of the standard cells may also be reduced. Accordingly, an instance of the standard cell included in the integrated circuit may be greatly influenced by its neighboring structure (i.e., layout), which may be referred to as local layout effect (LLE) or layout dependent effect (LDE).

SUMMARY

Embodiments of the inventive concept relate to a method and a computing system for manufacturing an integrated circuit including nanosheets, and may provide a method and a computing system for manufacturing an integrated circuit that may reduce process variations.

According to some embodiments of the inventive concept, there is provided a method of manufacturing an integrated circuit, the method including: generating layout data of the integrated circuit by placing and routing standard cells that define the integrated circuit, the standard cells including a nanosheet; generating timing analysis data by performing a timing analysis of the integrated circuit using the layout data; and regenerating the layout data of the integrated circuit by replacing and rerouting the standard cells that define the integrated circuit based on the timing analysis data and a shape of the nanosheet of the placed standard cells.

According to some embodiments of the inventive concept, there is provided a method of manufacturing an integrated circuit, the method including: generating layout data of the integrated circuit by placing and routing standard cells that define the integrated circuit, the standard cells comprising a nanosheet; extracting a target cell of the standard cells included in a clock path based on the layout data; and regenerating the layout data of the integrated circuit by replacing and rerouting the standard cells that define the integrated circuit based on shapes of the nanosheet in the target cell and in a neighboring cell of the standard cells placed adjacent to the target cell, respectively.

According to some embodiments of the inventive concept, there is provided a computing system for manufacturing an integrated circuit, the computing system including: a processor and a memory coupled to the processor and including computer readable program code embodied in the memory that is executable by the processor to perform operations including: generating, using a standard cell library, layout data of the integrated circuit by placing and routing standard cells that define the integrated circuit, the standard cells including a nanosheet; generating timing analysis data by performing a timing analysis of the integrated circuit using the layout data; regenerating the layout data of the integrated circuit by replacing and rerouting the standard cells that define the integrated circuit based on the timing analysis data and a shape of the nanosheet of the placed standard cells; and re-performing the timing analysis of the integrated circuit by using the regenerated layout data.

BRIEF DESCRIPTION OF THE DRAWINGS

Embodiments of the inventive concept will be more clearly understood from the following detailed description taken in conjunction with the accompanying drawings in which:

FIGS. 11A and 11B are diagrams that illustrate an LLE variation model of FIG. 9 according to some example embodiments of the inventive concept;

Figure 1:
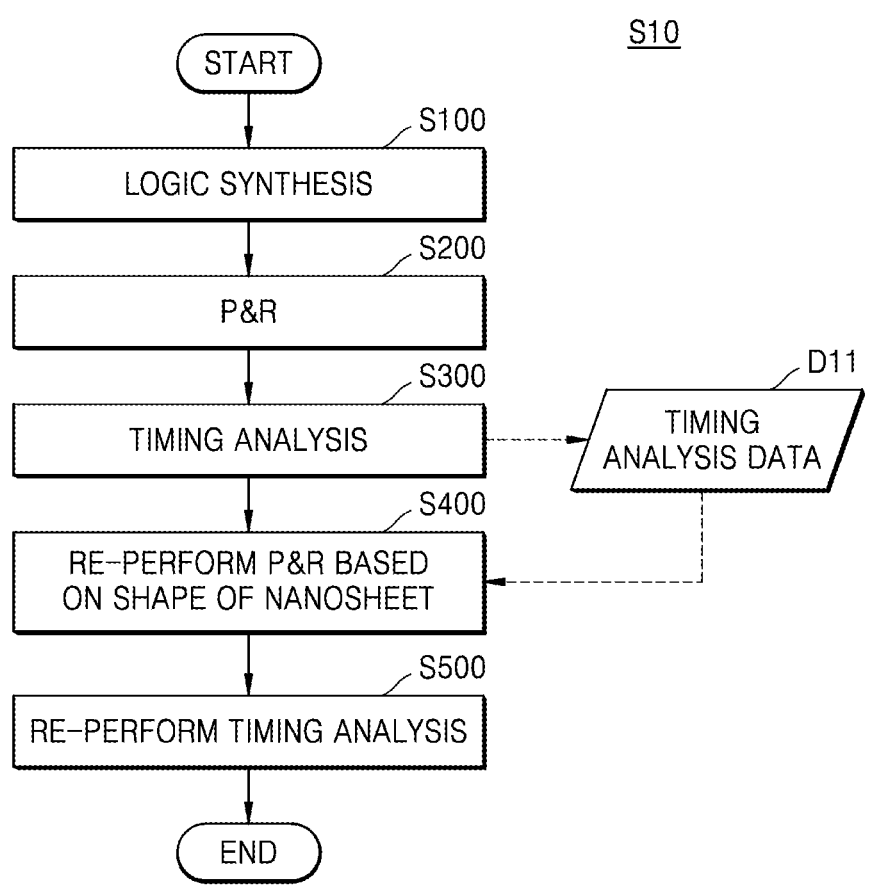
FIG. 1 is a flowchart illustrating a method of designing an integrated circuit, according to some example embodiments of the inventive concept.

The drawings attached herein, for convenience of illustration, may not be to scale and components thereof may be exaggerated or reduced.

DETAILED DESCRIPTION OF THE EMBODIMENTS

Hereinafter, embodiments of the inventive concepts will be described in detail with reference to the accompanying drawings. The same reference numerals are used for the same elements in the drawings, and redundant descriptions thereof will be omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a flowchart illustrating a method of designing an integrated circuit, according to some example embodiments of the inventive concept. Flowchart S10 of FIG. 1 may include blocks S100 to S500.

Referring to FIG. 1, the method of designing the integrated circuit, according to some embodiments of the inventive concept, may be performed by using a tool for designing the integrated circuit as an operation for designing a layout for the integrated circuit. In some embodiments, the tool for designing the integrated circuit may be a program (e.g., 1400_1 of FIG. 15) that may include a plurality of instructions to be executed by a processor (e.g., 1100 of FIG. 15). Accordingly, the method of designing the integrated circuit may be referred to as a computer implemented method for the design of the integrated circuit.

At block S100, a synthesis operation may be performed. For example, block S100 may be performed by the processor by using a synthesis tool. "Synthesis" may be an operation of generating a netlist by converting input data with respect to the integrated circuit into a hardware form of logic gates, which may be referred to as "logic synthesis." "Input data" may be an abstract form with respect to the behavior of the integrated circuit, for example, data defined in a register transfer level (RTL). The "netlist" may be generated from RTL code by using a standard cell library (e.g., D20 in FIG. 14) and may be a gate level netlist. In an example embodiment, the RTL code may be provided to the synthesis tool as an input file, and the netlist may be output as an output file in the synthesis tool.

At block S200, standard cells that define the integrated circuit may be placed and routed (hereinafter, "placement & routing (P&R)"). For example, block S200 may be performed by the processor by using a P&R tool. By placing the standard cells that define the integrated circuit according to the netlist by using the standard cell library (e.g., D20 in FIG. 14) and routing nets included in the placed standard cells, layout data for the integrated circuit may be generated. For example, the layout data may be data of a graphic design system (GDS) II format. In an example embodiment, the netlist may be provided as an input file to the P&R tool, and the layout data may be output as an output file in the P&R tool.

Here, "net" may denote an equipotential in an equivalent circuit diagram of the integrated circuit and may correspond to one interconnection in the layout of the integrated circuit. One interconnection may correspond to a wiring structure including at least one metal layer and at least one via electrically connected to each other. Thus, the interconnection may electrically connect the output pin to the input pin of the standard cell, and by creating the interconnections, the standard cells may be routed.

At block S300, a timing analysis of the integrated circuit may be performed. For example, block S300 may be performed by the processor by using a static timing analysis (STA) tool. Timing analysis data D11 may be output as the output file in the STA tool.

The "timing analysis" may refer to an operation of determining whether timing paths included in the integrated circuit satisfy timing constraints, and then, based on a result of the timing path timing constraint determination, selecting a timing path or a timing critical path of the integrated circuit of which the total timing delay from the input (i.e., a starting point) to the output (i.e., an end point) exceeds the timing constraints, among the timing paths. The timing constraints may include setup timing constraints and hold timing constraints.

At block S400, the P&R may be re-performed based on a shape of a nanosheet included in the standard cells. As the P&R is re-performed, the layout data with respect to the integrated circuit may be regenerated. For example, block S400 may be performed by a processor by referring to a standard cell library D20 and using the P&R tool.

In an example embodiment, the standard cell included in the timing critical path among the standard cells to be placed based on the timing analysis data D11 may be extracted as a target cell, and the shape of the nanosheet of the target cell may be compared to the shape of the nanosheet of a neighboring cell to be placed adjacent to the target cell. According to a result of the comparison, the neighboring cell to be placed adjacent to the target cell may be substituted with another cell, or a filler cell may be inserted between the target cell and the neighboring cell. Block S400 will be described in detail with reference to the accompanying drawings, such as FIG. 4.

As the P&R is re-performed, the layout data of the integrated circuit may be regenerated, and in block S500, the timing analysis of the integrated circuit may be re-performed by using the regenerated layout data. For example, block S500 may be performed by the processor by using the STA tool.

The method of manufacturing the integrated circuit according to some embodiments of the inventive concept may reduce process variations that may occur based on the shape of the nanosheet by re-performing the P&R operation based on the shape of the nanosheet included in the standard cells. Accordingly, the possibility of violating the timing constraints of the integrated circuit may be reduced and, thus, the timing characteristics may be improved.

Figure 2:
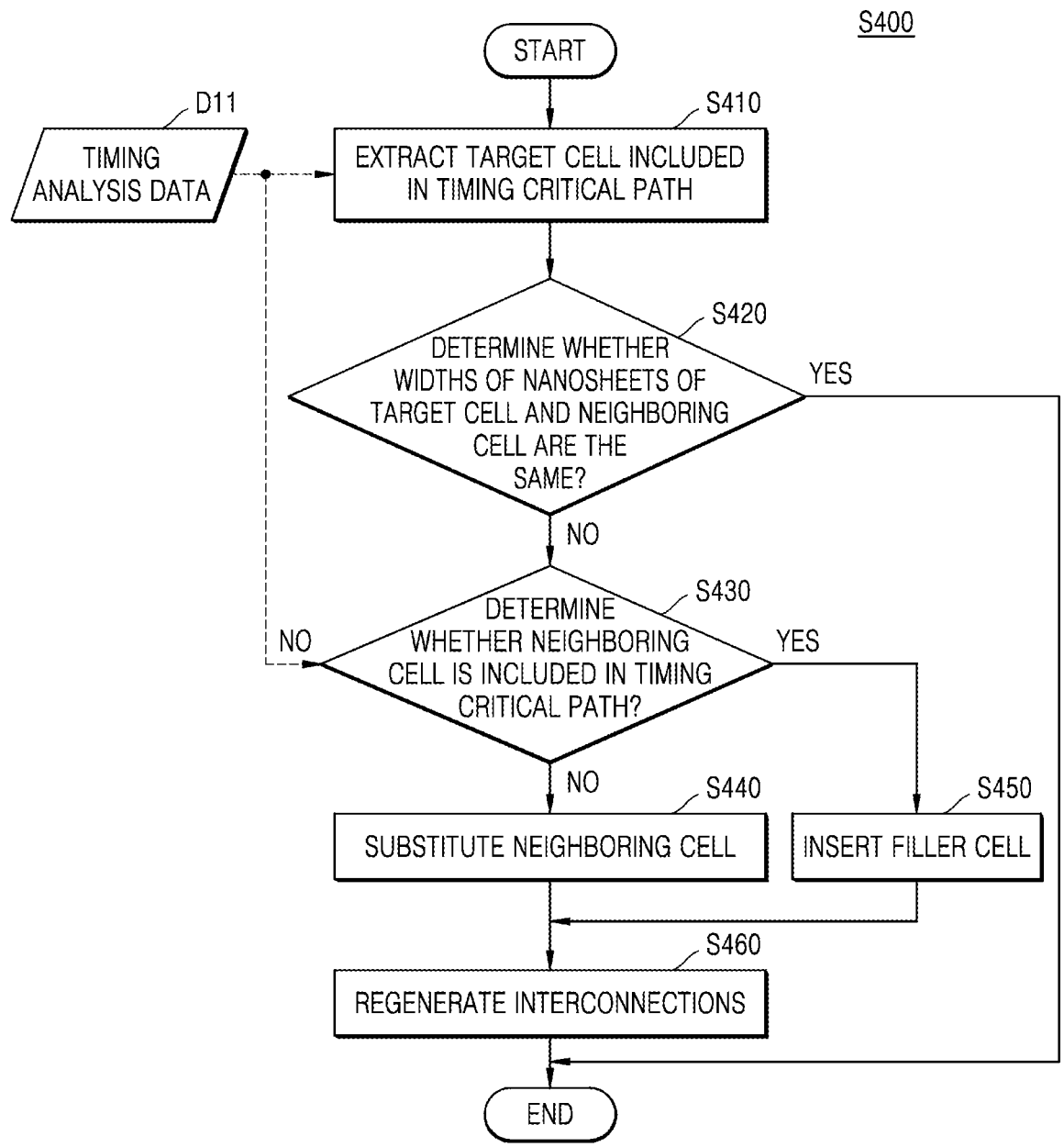
FIG. 2 is a flowchart illustrating a method of designing an integrated circuit, according to some example embodiments of the inventive concept.

FIG. 2 is a flowchart illustrating a method of designing the integrated circuit according to some example embodiments of the inventive concept, and further illustrates an example embodiment of block S400 of FIG. 1. Flowchart S400 of FIG. 2 may include blocks S410 to S460.

Referring to FIG. 2, at block S410, the target cell included in the timing critical path may be extracted by using the timing analysis data D11. For example, in the timing analysis operation (e.g., S300 of FIG. 1), critical timing paths having a slack below the reference may be extracted from the timing paths included in the integrated circuit, and in block S410, the target cell among the standard cells included in the extracted timing critical paths may be extracted. For example, a clock path may be included in the timing critical path.

At block S420, it may be determined whether widths of the nanosheet of the extracted target cell are the same as the neighboring cell to be placed adjacent to the target cell. For example, a width of the nanosheet of the first neighboring cell to be placed adjacent to the target cell in a first direction (e.g., +X direction) and a width of the nanosheet of the target cell may be compared, and the width of the nanosheet of the second neighboring cell to be placed adjacent to the target cell in a reverse direction to the first direction (e.g., −X direction) and the width of the nanosheet of the target cell may be compared. When the widths of the nanosheets of the extracted target cell and the neighboring cell to be placed adjacent to the target cell are the same, block S400 may be terminated, and a process operation of the integrated circuit may be performed according to layout data (for example, D30 in FIG. 14) generated by performing operations of the flowchart S10 of FIG. 1.

When the width of the nanosheets of the extracted target cell is different from that of the neighboring cell to be placed adjacent to the target cell, at block S430, it may be determined whether the neighboring cell of the target cell is included in the timing critical path by using the timing analysis data D11. When the neighboring cell of the target cell is not included in the timing critical path, at block S440, the neighboring cell may be substituted with a standard cell that may perform the same or similar function as the neighboring cell and may have the same shape as the target cell in an adjacent region. The substituted standard cell may be replaced to be adjacent to the target cell. For example, when the width of the nanosheet of the first neighboring cell to be placed adjacent to target cell in the +X direction and the width of the nanosheet of the target cell are different from each other and the first neighboring cell is not included in the timing critical path, the first neighboring cell may be substituted with the standard cell that may perform the same or similar function as the first neighboring cell and may include the nanosheet having the same width as that of the nanosheet of the target cell in the adjacent region.

When the neighboring cell of the target cell is included in the timing critical path, at block S450, the filler cell may be inserted between the target cell and the neighboring cell. For example, when the width of the nanosheet of the neighboring cell and the width of the nanosheet of the target cell are different from each other and the neighboring cell is included in the timing critical path, the filler cell may be inserted between the target cell and the neighboring cell. In some embodiments, the filler cell may include a nanosheet having the same shape as the nanosheet of the target cell in the adjacent region adjacent to the target cell and having the same shape as the nanosheet of the neighboring cell in the adjacent region adjacent to the neighboring cell.

When the neighboring cell is included in the timing critical path and the neighboring cell is substituted with another cell, the timing characteristic of the timing critical path including the neighboring cell may be changed in a direction in which the size of the slack increases. Therefore, by inserting the filler cell between the neighboring cell and the target cell, it is possible to reduce or prevent excessive changes to the timing characteristic of the timing critical path including the neighboring cell.

However, methods of manufacturing the integrated circuit according to the inventive concept is not limited to performing operations of blocks S430, S440, and S450. The methods of manufacturing the integrated circuit according to some embodiments of the inventive concept may also include inserting the filler cell between the target cell and the neighboring cell, if the widths of the nanosheet of the extracted target cell and neighboring cell are different from each other, without checking whether the neighboring cell of the target cell is included in the timing critical path.

At block S460, the interconnections may be regenerated according to the placement of the changed standard cells. Thus, layout data may be regenerated.

Figure 3:
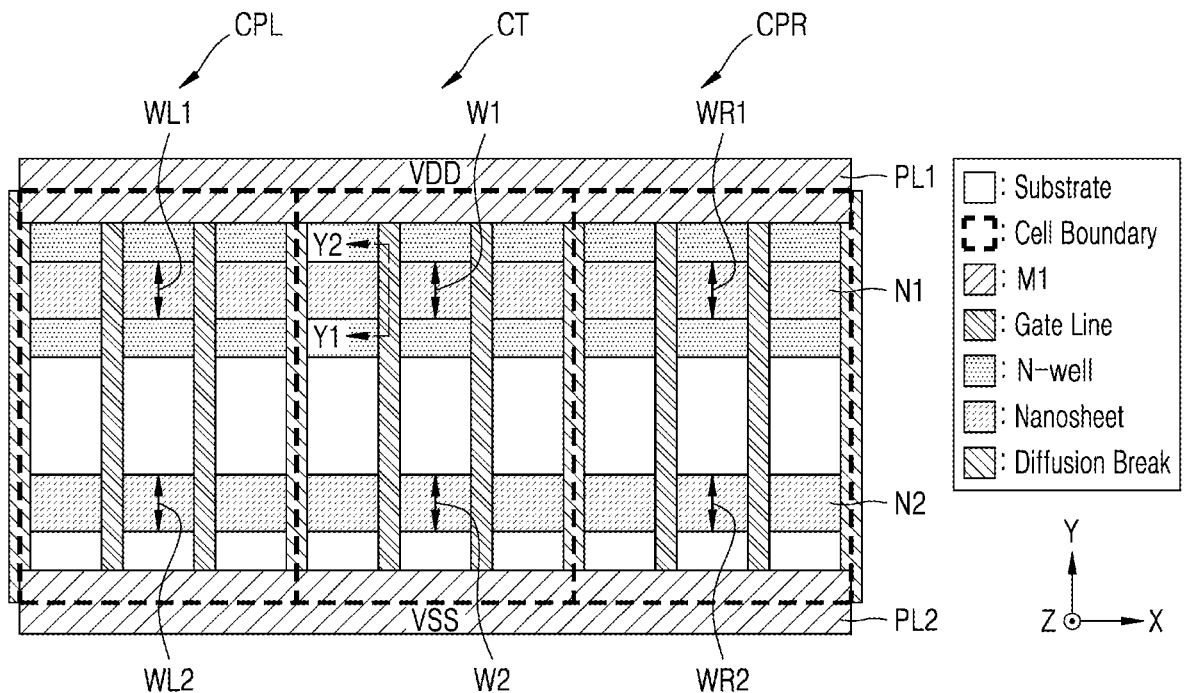
FIG. 3 is a plan view illustrating cells included in an integrated circuit according to some example embodiments of the inventive concept.
Figure 4:
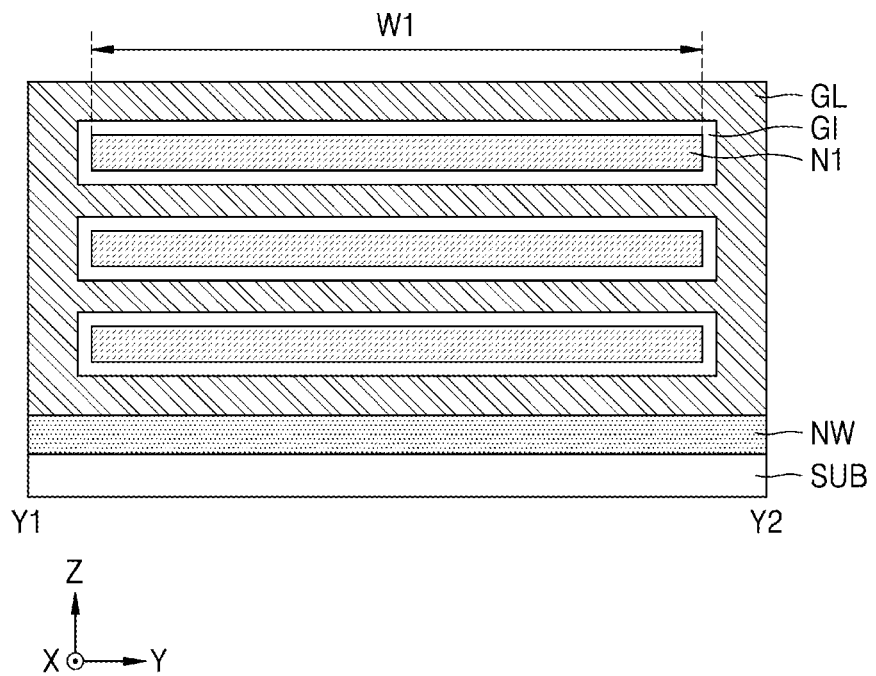
FIG. 4 is a cross-sectional view taken along a line Y1-Y2 in FIG. 3.

FIG. 3 is a plan view illustrating cells CT, CPR, and CPL included in an integrated circuit according to some example embodiments of the inventive concept. FIG. 4 is a cross-sectional view taken along a line Y1-Y2 in FIG. 3.

As used herein, a plane consisting of an X-axis and a Y-axis may be referred to as a horizontal plane, and a component placed in a +Z direction relative to another component may be referred to as being above another component, and the component placed in a −Z direction relative to another component may be referred to as being under or below the other component. In the drawings, only some layers may be shown for convenience of illustration, and for ease of understanding, vias may be displayed despite being under a pattern of metal layers.

Referring to FIGS. 3 and 4, the integrated circuit may include a target cell CT, a first neighboring cell CPR, and a second neighboring cell CPL. The first neighboring cell CPR may be placed to be adjacent to the target cell CT in the +X direction, and the second neighboring cell CPL may be placed to be adjacent to the target cell CT in the −X direction. That is, for example, the first neighboring cell CPR may be placed on a right side of the target cell CT, and the second neighboring cell CPL may be placed on a left side of the target cell CT. In an example embodiment, the target cell CT may be the standard cell included in the timing critical path.

A diffusion break that defines the standard cell may be formed between the target cell CT, the first neighboring cell CPR, and the second neighboring cell CPL. The diffusion break may electrically insulate the target cell CT, the first neighboring cell CPR, and the second neighboring cell CPL from each other. The diffusion break may include a double diffusion break (DDB) and a single diffusion break (SDB) based on a structure thereof. In an example embodiment, the diffusion break included in the integrated circuit may be the single diffusion break.

The target cell CT, the first neighboring cell CPR, and the second neighboring cell CPL may be formed on a substrate SUB and may include a first nanosheet N1 and a second nanosheet N2 extending in the X-axis direction. In an example embodiment, the first nanosheet N1 may be placed on an N well NW doped with an N-type impurity.

The first nanosheet N1 and the second nanosheet N2 may function as a channel of a transistor. For example, the first nanosheet N1 may be doped with an N-type impurity and may constitute a portion of a P-channel metal-oxide-semiconductor (PMOS) transistor. In contrast, the second nanosheet N2 may be doped with a P-type impurity and may constitute a portion of a N-channel metal-oxide-semiconductor (NMOS) transistor. In an example embodiment, the first nanosheet N1 and the second nanosheet N2 may include Si, Ge, or SiGe. In an example embodiment, the first nanosheet N1 and the second nanosheet N2 may include InGaAs, InAs, GaSb, InSb, or combinations thereof.

Each of the first nanosheet N1 and the second nanosheet N2 may include patterns respectively formed in a plurality of layers to be stacked in the Z direction. For example, each of the first nanosheet N1 and the second nanosheet N2 may include layers of a conductive channel material. In FIG. 4, the first nanosheet N1 is illustrated to include patterns formed in three layers on the substrate SUB, but embodiments of the inventive concept are not limited thereto. The number of patterns to be formed on different layers included in the first nanosheet N1 and the second nanosheet N2 may be variously changed.

The first nanosheet N1 included in the target cell CT may extend in the X-axis direction with a first width W1 in the Y-axis direction, and the second nanosheet N2 included in the target cell CT may extend in the X-axis direction with a second width W2 in the Y-axis direction. In an example embodiment, the first width W1 may be the same as the second width W2.

The first nanosheet N1 included in the first neighboring cell CPR may extend in the X-axis direction with the first width WR1 in the Y-axis direction, and the second nanosheet N2 included in the first neighboring cell CPR may extend in the X-axis direction with the second width WR2 in the Y-axis direction. The first nanosheet N1 included in the second neighboring cell CPL may extend in the X-axis direction with the first width WL1 in the Y-axis direction, and the second nanosheet N2 included in the second neighboring cell CPL may extend in the X-axis direction with the second width WL2 in the Y-axis direction.

In an example embodiment, the widths of the nanosheets of cells to be placed adjacent to each other may be the same. For example, the first width W1 of the first nanosheet N1 of the target cell CT may be the same as the first width WR1 of the first nanosheet N1 of the first neighboring cell CPR and may be the same as the first width WL1 of the first nanosheet N1 of the second neighboring cell CPL. In addition, for example, the second width W2 of the second nanosheet N2 of the target cell CT may be the same as the second width WR2 of the second nanosheet N2 of the first neighboring cell CPR and may be the same as the second width WL2 of the second nanosheet N2 of the second neighboring cell CPL. In an example embodiment, at block S200 of FIG. 1, when the target cell CT, the first neighboring cell CPR, and the second neighboring cell CPL are placed and routed, the operations or blocks S430 to S460 of FIG. 2 may not be performed.

The target cell CT, the first neighboring cell CPR, and the second neighboring cell CPL may include a gate line GL formed on the substrate SUB and extending in the Y-axis direction. In an example embodiment, the gate line GL may include a work function metal-containing layer and a gap-fill metal film. For example, the work function metal-containing layer may include one or more of the following metals: Ti, W, Ru, Nb, Mo, Hf, Ni, Co, Pt, Yb, Tb, Dy, Er, and Pd, and the gap-fill metal film may include a W film and/or an Al film. In an example embodiment, the gate line GL may include a stacked structure of TiAlC/TiN/W, a stacked structure of TiN/TaN/TiAlC/TiN/W, and/or a stacked structure of TiN/TaN/TiN/TiAlC/TiN/W.

The gate line GL may be formed to border or surround portions of the first nanosheet N1 and the second nanosheet N2. A gate insulating film GI may be formed between the gate line GL and the first nanosheet N1. In an example embodiment, the gate insulating film GI may include a silicon oxide film, a silicon oxynitride film, a high dielectric film having a higher dielectric constant than the silicon oxide film, or combinations thereof. For example, the gate insulating film GI may include $HfO_2$, HfSiO, HfSiON, HfTaO, HfSiO, HfZrO, zirconium oxide, aluminum oxide, $HfO_2$—$Al_2O_3$ alloy, or combinations thereof, but embodiments of the inventive concept are not limited thereto.

To supply power to cells, power lines extending in the X-axis direction may be placed. For example, the target cell CT, the first neighboring cell CPR, and the second neighboring cell CPL may share a first power line PL1 and a second power line PL2 and may be powered through the first power line PL1 and the second power line PL2. In FIG. 3, the first power line PL1 and the second power line PL2 are shown and described as a pattern of an M1 layer, but example embodiments of the inventive concept are not limited thereto. In an example embodiment, the power lines may be formed as a pattern of a wiring layer over the M1 layer, for example an M2 layer. In an example embodiment, a first supply voltage VDD may be applied to the first power line PL1, and a second supply voltage VSS may be applied to the second power line PL2.

Figure 5A:
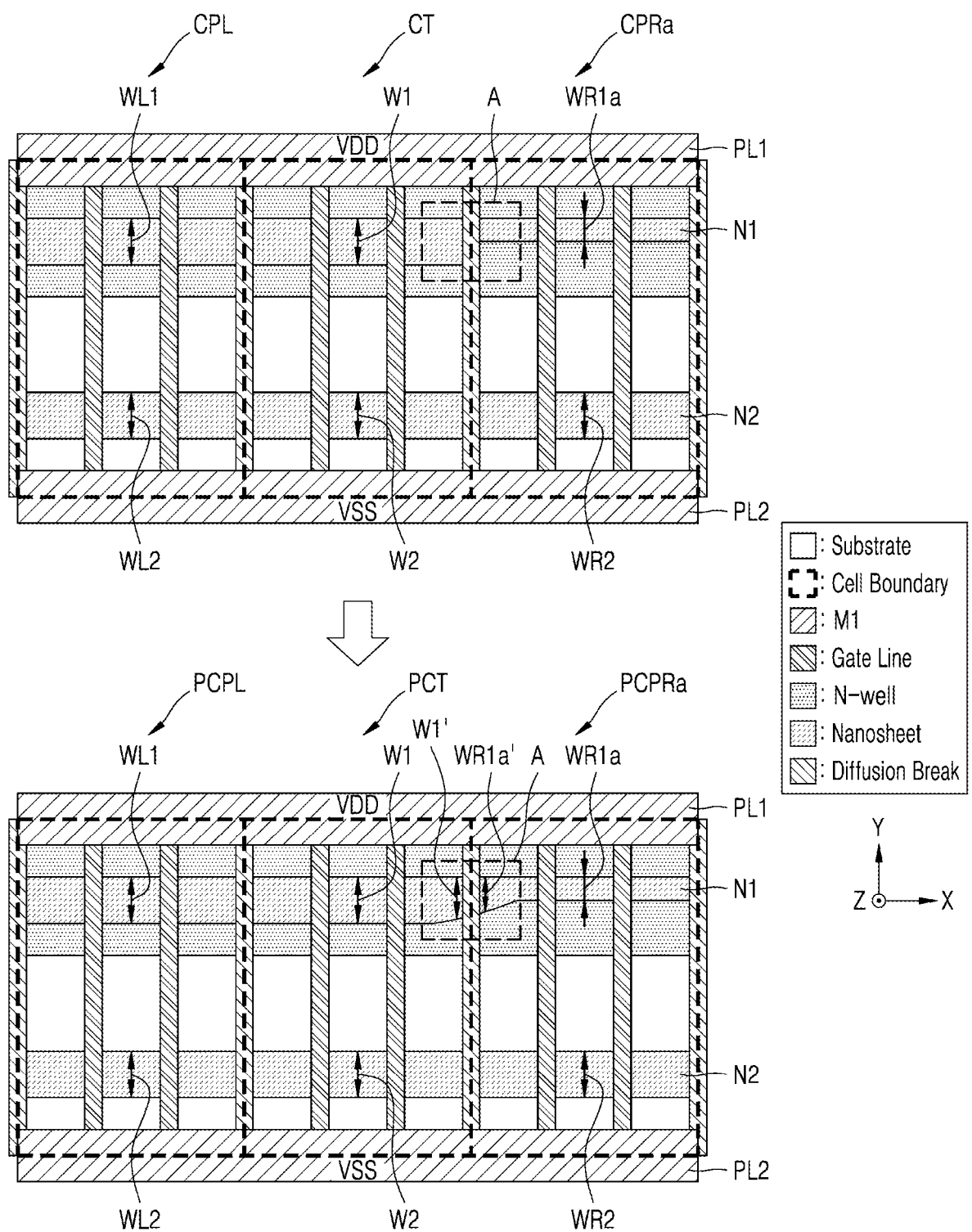
FIG. 5A is a plan view illustrating cells included in an integrated circuit according to some example embodiments of the inventive concept.
Figure 5B:
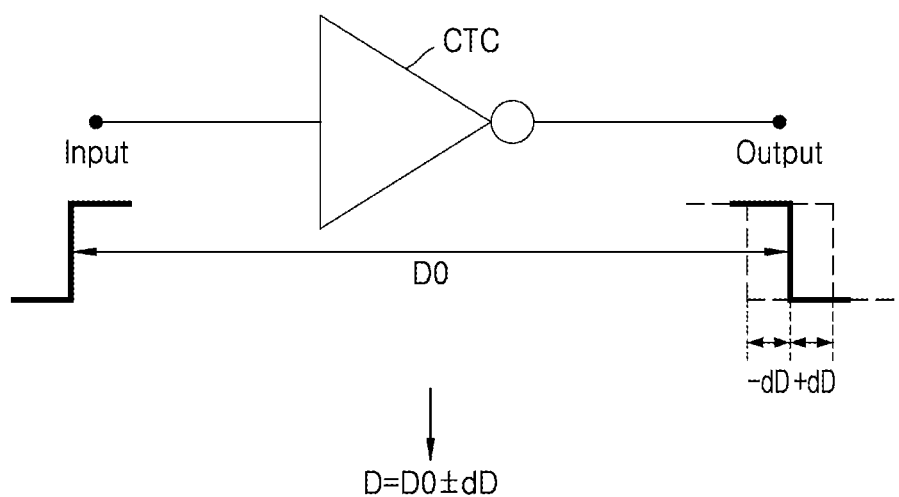
FIG. 5B is a diagram illustrating a change in a timing characteristic of a target cell according to a shape of the nanosheet of a neighboring cell according to some example embodiments of the inventive concept.
Figure 6:
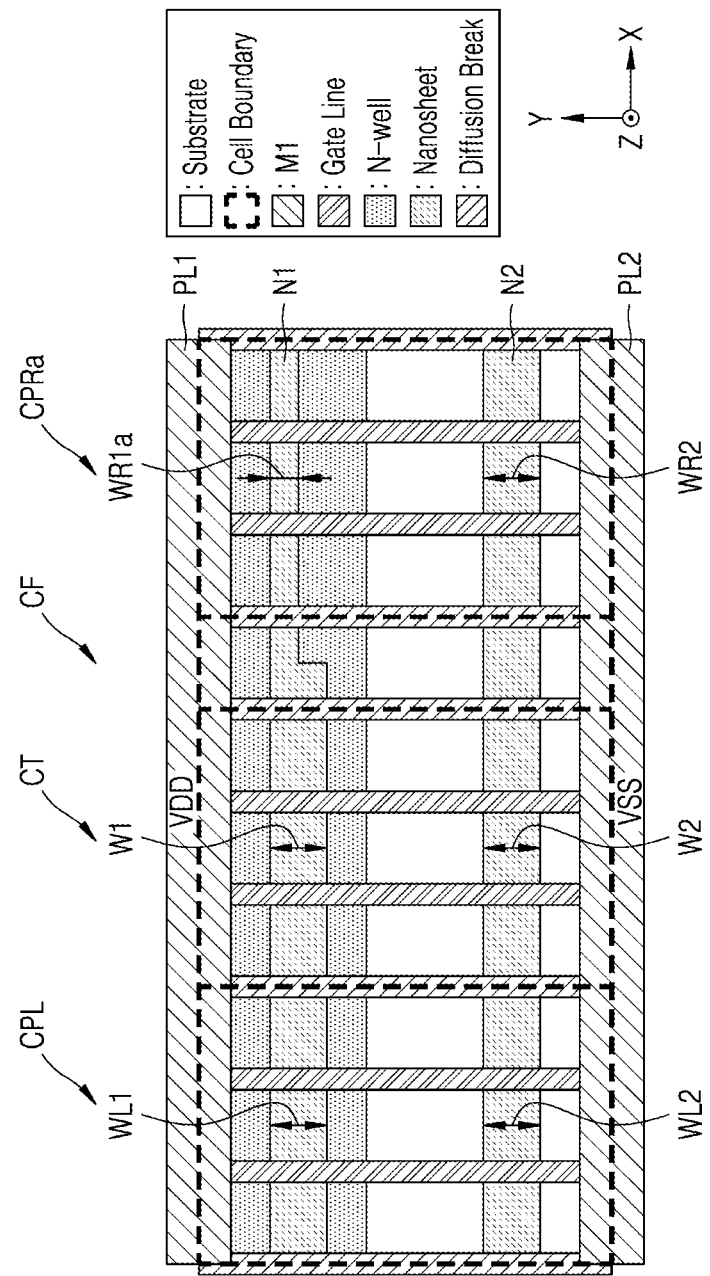
FIG. 6 is a plan view illustrating cells included in an integrated circuit according to some example embodiments of the inventive concept.

FIG. 5A is a plan view illustrating a standard cell CT, a first neighboring cell CPRa, and a second neighboring cell CPL included in an integrated circuit according to an example embodiment of the inventive concept and further illustrates example embodiments of block S420 of FIG. 2. FIG. 5B is a diagram that illustrates changes in the timing characteristic of the target cell based on the shape of the nanosheet of the neighboring cell according to some embodiments of the inventive concept. FIG. 6 is a plan view illustrating cells CT, CPRa, CF, and CPL included in an integrated circuit according to some example embodiments of the inventive concept and further illustrates example embodiments of block S450 of FIG. 2. In the description of FIGS. 5A and 6, duplicate description with respect to the same reference numerals as those of FIG. 3 will be omitted.

Referring to FIG. 5A, in the P&R operation (e.g., S200 of FIG. 1), the target cell CT may be placed, a first neighboring cell CPRa may be placed to be adjacent to the target cell CT in the +X direction from the target cell CT, and the second neighboring cell CPL may be placed to be adjacent to the target cell CT in the −X direction from the target cell CT. The first nanosheet N1 included in the first neighboring cell CPRa may extend in the X-axis direction with a first width WR1$a$ in the Y-axis direction, and the second nanosheet N2 included in the first neighboring cell CPRa may extend in the X-axis direction with a second width WR2 in the Y-axis direction.

In an example embodiment, the first width W1 of the first nanosheet N1 of the target cell CT may be different from the first width WR1$a$ of the first nanosheet N1 of the first neighboring cell CPRa. For example, the first width WR1$a$ of the first nanosheet N1 of the first neighboring cell CPRa may be less than the first width W1 of the first nanosheet N1 of the target cell CT. A jog pattern may be formed in the first nanosheet N1 in an adjacent region A in which the target cell CT and the first neighboring cell CPRa are adjacent to each other.

However, embodiments of the inventive concept are not limited thereto, and the first width WR1$a$ of the first nanosheet N1 of the first neighboring cell CPRa may be greater than the first width W1 of the first nanosheet N1 of the target cell CT. In other embodiments, the second width W2 of the second nanosheet N2 of the target cell CT may be different from the second width WR2$a$ of the second nanosheet N2 of the first neighboring cell CPRa.

According to a comparative example, if process operations (e.g., block S40 of FIG. 14) of the target cell CT and the first neighboring cell CPRa in which the jog pattern is formed are performed without performing operation S400, due to the process variations, the first nanosheet N1 of a target cell PCT in the operation of block S40 may be reduced in width at the adjacent region A, relative to the first nanosheet N1 of the target cell CT in the design flowchart operations S10 of FIG. 1. In addition, the first nanosheet N1 of a first neighboring cell PCPRa in the operation of block S40 may be increased in width at the adjacent region A, relative to the first nanosheet N1 of the first neighboring cell CPRa of the design flowchart operations S10 of FIG. 1. That is, in the adjacent region A, the first nanosheet N1 of the target cell PCT may have a first width W1' different from the first width W1 in a region other than the adjacent region A and the first nanosheet N1 of the first neighboring cell PCPRa may have a first width WR1a' different from the first width WR1a in a region other than the adjacent region A. Therefore, due to such process variations, there may be a change in the delay through the timing path including the target cell PCT or the timing path including the first neighboring cell PCPRa, which may result in violation to the timing constraints of the timing path.

Referring to FIGS. 5A and 5B, for example, the target cell PCT may function as an inverter CTC. Delay D of the target cell PCT, in which an input signal is input and then an output signal is output, may be the sum of delay D0 of the target cell CT without considering the process variations and the change (+dD, or −dD) of the delay according to the process variations. Accordingly, when the operations of block S400 are not performed according to the comparative example, the timing characteristic of the timing path analyzed in the timing analysis step (for example, S300 of FIG. 1) and the timing characteristic of the actual timing path after the integrated circuit is manufactured may be different. In particular, with respect to the timing critical path, the probability of a violation to the timing constraints may be further increased.

Referring to FIGS. 4 and 5A, the process variation may occur in the target cell CT due to the first neighboring cell CPRa to be adjacently placed, in which the target cell CT is included in the timing critical path among the standard cells to be placed in the P&R block S200. Accordingly, the method of manufacturing the integrated circuit according to some embodiments of the inventive concept may include the re-performing P&R (S400), based on the shapes of the first nanosheet N1 and the second nanosheet N2 included in the target cell CT, the first neighboring cell CPRa, and the second neighboring cell CPL. When the first neighboring cell CPRa is not included in the timing critical path, the first neighboring cell CPRa may be substituted with the first neighboring cell CPR of FIG. 3 (S440). By substituting the first neighboring cell CPRa of FIG. 5A with the first neighboring cell CPR of FIG. 3, the first width W1 of the first nanosheet N1 of the target cell CT and the first width WR1 of the first nanosheet N1 of the first neighboring cell CPR to be adjacently placed may be equal to each other, and, thus, the change of the delay of the target cell CT due to the process variation may be reduced.

However, embodiments of the inventive concept are not limited thereto, and the jog pattern may be formed in the second nanosheet N2 in the adjacent region where the target cell CT and the first neighboring cell CPRa are adjacent to each other, and even when the first neighboring cell CPRa is not included in the timing critical path, the first neighboring cell CPRa of FIG. 5A may be substituted with the first neighboring cell CPR of FIG. 3. Accordingly, the second width WR2 of the second nanosheet N2 of the first neighboring cell CPR may be the same as the second width W2 of the second nanosheet N2 of the target cell CT.

Referring to FIGS. 4, 5A, and 6, when the first width WR1a of the first nanosheet N1 of the first neighboring cell CPRa is different from the first width W1 of the first nanosheet N1 of the target cell CT, and the first neighboring cell CPRa is included in the timing critical path, the filler cell CF may be inserted between the target cell CT and the first neighboring cell CPRa (S450).

The filler cell CF may have the same width as the first width W1 of the first nanosheet N1 of the target cell CT in a region adjacent to the target cell CT and may include the first nanosheet N1 having the same width as the first width WR1a of the first nanosheet N1 of the first neighboring cell CPRa in a region adjacent to the first neighboring cell CPRa. In addition, the filler cell CF may have the same width as the second width W2 of the second nanosheet N2 of the target cell CT in the region adjacent to the target cell CT and may include the second nanosheet N2 having the same width as the second width WR2 of the second nanosheet N2 of the first neighboring cell CPRa in the region adjacent to the first neighboring cell CPRa. That is, the jog pattern may be formed in the first nanosheet N1 in the filler cell CF.

However, embodiments of the inventive concept are not limited thereto, and even when the second width WR2 of the second nanosheet N2 of the first neighboring cell CPRa is different from the second width W2 of the second nanosheet N2 of the target cell CT, and the first neighboring cell CPRa is included in the timing critical path, the filler cell may be inserted between the target cell CT and the first neighboring cell CPRa. In addition, the filler cell may have the same width as the second width W2 of the second nanosheet N2 of the target cell CT in the region adjacent to the target cell CT and may include the second nanosheet N2 having the same width as the second width WR2 of the second nanosheet N2 of the first neighboring cell CPRa in the region adjacent to the first neighboring cell CPRa. That is, the jog pattern may be formed in the second nanosheet N2 in the filler cell.

Therefore, the method of manufacturing the integrated circuit according to some embodiments of the inventive concept may reduce the process variation that may occur by manufacturing the target cell CT in the process operations of the integrated circuit and may reduce the possibility of violating timing constraints of the critical timing path including the target cell CT.

Figure 7A:
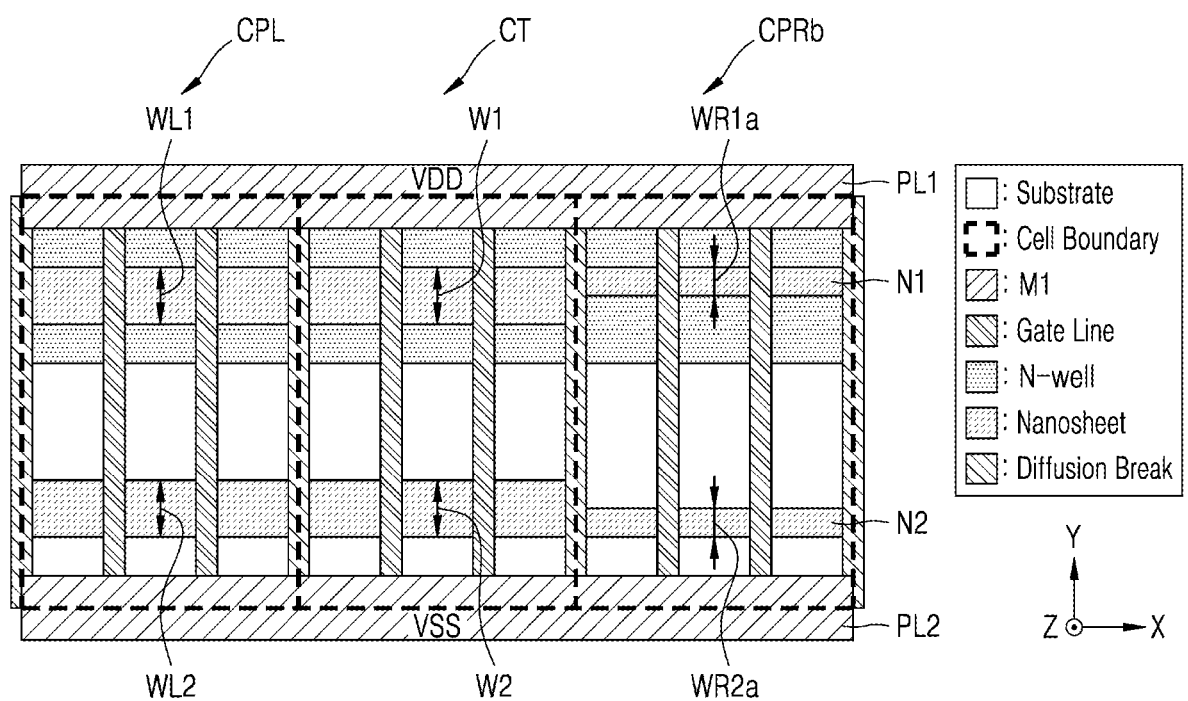
FIGS. 7A and 7B are plan views illustrating cells included in an integrated circuit according to some example embodiments of the inventive concept.
Figure 7B:
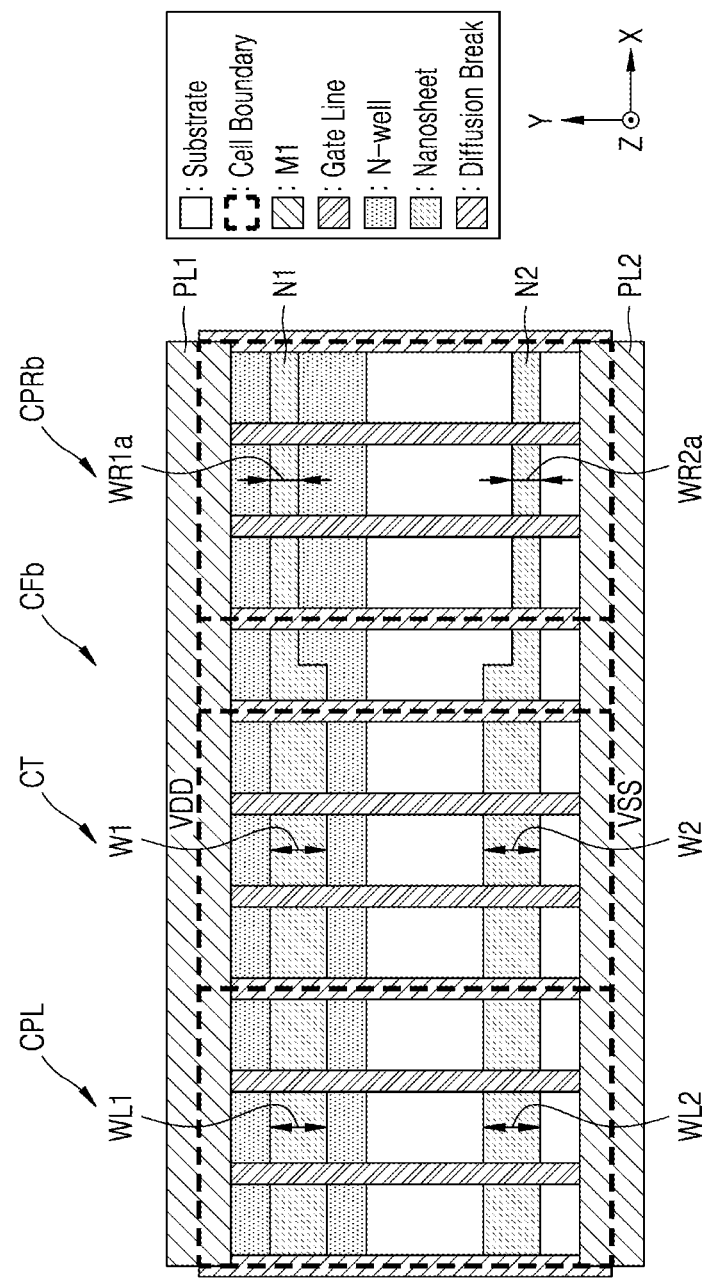

FIG. 7A is a plan view illustrating cells CT, CPRb, and CPL included in an integrated circuit according to some example embodiments of the inventive concept and further illustrates example embodiments of block S420 of FIG. 2. FIG. 7B is a plan view illustrating cells CT, CPRb, CFb, and CPL included in an integrated circuit according to some example embodiments of the inventive concept and further illustrates example embodiments of block S450 of FIG. 2. In the description of FIGS. 7A and 7B, duplicate description with respect to the same reference numerals as those of FIG. 3 will be omitted.

Referring to FIG. 7A, in the P&R operation (e.g., S200 of FIG. 1), the target cell CT may be placed, a first neighboring cell CPRb may be placed to be adjacent to the target cell CT in the +X direction from the target cell CT, and the second neighboring cell CPL may be placed to be adjacent to the target cell CT in the −X direction from the target cell CT. The first nanosheet N1 included in the first neighboring cell CPRb may extend in the X-axis direction with a first width WR1a in the Y-axis direction, and the second nanosheet N2 included in the first neighboring cell CPRb may extend in the X-axis direction with a second width WR2a in the Y-axis direction.

In an example embodiment, the first width W1 of the first nanosheet N1 of the target cell CT may be different from the first width WR1a of the first nanosheet N1 of the first neighboring cell CPRb. For example, the first width WR1a of the first nanosheet N1 of the first neighboring cell CPRb may be less than the first width W1 of the first nanosheet N1 of the target cell CT. In an example embodiment, the second width W2 of the second nanosheet N2 of the target cell CT may be different from the second width WR2a of the second nanosheet N2 of the first neighboring cell CPRb. For example, the second width WR2a of the second nanosheet N2 of the first neighboring cell CPRb may be less than the second width W2 of the second nanosheet N2 of the target cell CT. However, embodiments of the inventive concept are not limited thereto, and the first width WR1a of the first nanosheet N1 of the first neighboring cell CPRb may be greater than the first width W1 of the first nanosheet N1 of the target cell CT, and the second width WR2a of the second nanosheet N2 of the first neighboring cell CPRb may be greater than the second width W2 of the second nanosheet N2 of the target cell CT. Therefore, the jog pattern may be formed in each of the first nanosheet N1 and the second nanosheet N2 in the adjacent region where the target cell CT and the first neighboring cell CPRb are adjacent to each other.

Referring to FIGS. 4 and 7A, a process variation may occur in the target cell CT due to the first neighboring cell CPRb to be adjacently placed, in which the target cell CT is included in the timing critical path among the standard cells to be placed in the P&R operation S200. Accordingly, the method of manufacturing the integrated circuit according to some embodiments of the inventive concept may include the re-performing P&R (S400), based on the shapes of the first nanosheet N1 and the second nanosheet N2 included in the target cell CT, the first neighboring cell CPRb, and the second neighboring cell CPL. When the first neighboring cell CPRb is not included in the timing critical path, the first neighboring cell CPRb may be substituted with the first neighboring cell CPR of FIG. 3 (S440). By substituting the first neighboring cell CPRb of FIG. 7A with the first neighboring cell CPR of FIG. 3, the first width W1 of the first nanosheet N1 of the target cell CT and the first width WR1 of the first nanosheet N1 of the first neighboring cell CPR may be equal to each other, and the second width W2 of the second nanosheet N2 of the target cell CT and the second width WR2 of the second nanosheet N2 of the first neighboring cell CPR may be equal to each other. Therefore, the change of the delay due to the process variation associated with the target cell CT may be reduced.

Referring to FIGS. 4, 7A, and 7B, when the shapes of the first and second nanosheets N1 and N2 of the first neighboring cell CPRb and the shapes of the nanosheets N1 and N2 of the target cell CT are different from each other and the first neighboring cell CPRb is included in the timing critical path, a filler cell CFb may be inserted between the target cell CT and the first neighboring cell CPRb (S450).

The filler cell CFb may have the same width as the first width W1 of the first nanosheet N1 of the target cell CT in the region adjacent to the target cell CT and may include the first nanosheet N1 having the same width as the first width WR1a of the first nanosheet N1 of the first neighboring cell CPRb in the region adjacent to the first neighboring cell CPRb. In addition, the filler cell CFb may have the same width as the second width W2 of the second nanosheet N2 of the target cell CT in the region adjacent to the target cell CT and may include the second nanosheet N2 having the same width as the second width WR2a of the second nanosheet N2 of the first neighboring cell CPRb in the region adjacent to the first neighboring cell CPRb. That is, the jog pattern may be formed in the first nanosheet N1 and the second nanosheet N2 in the filler cell CFb.

Figure 8A:
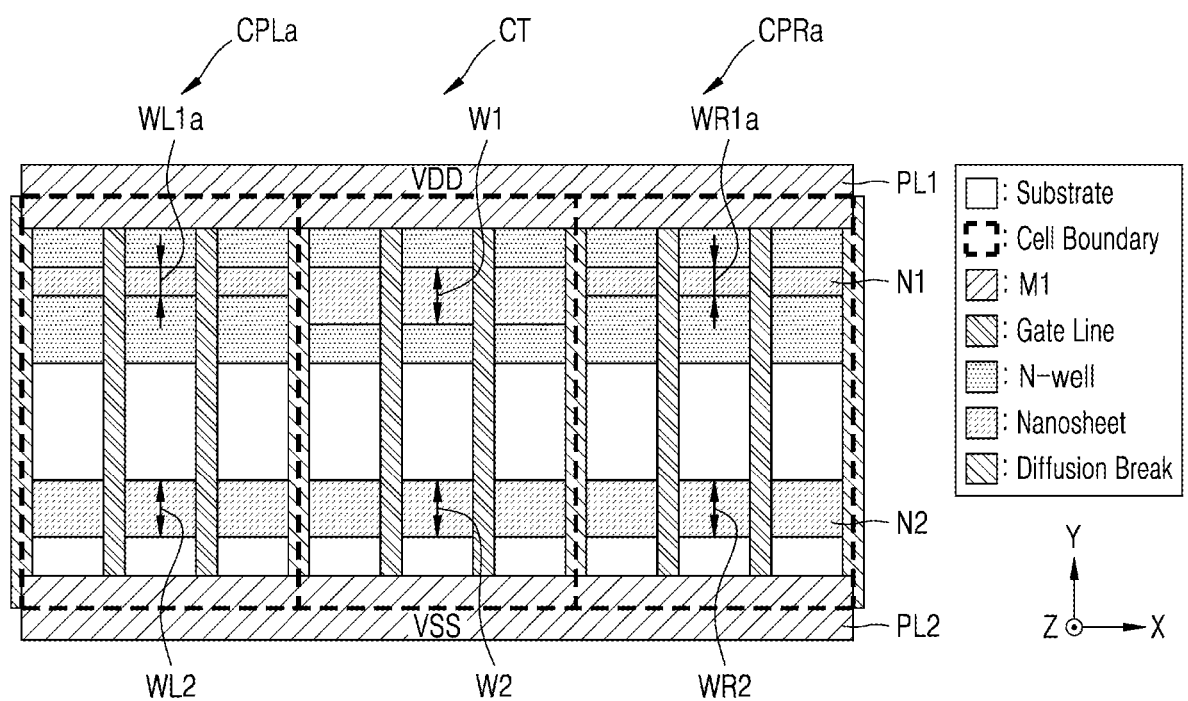
FIGS. 8A and 8B are plan views illustrating cells included in an integrated circuit according to some example embodiments of the inventive concept.
Figure 8B:
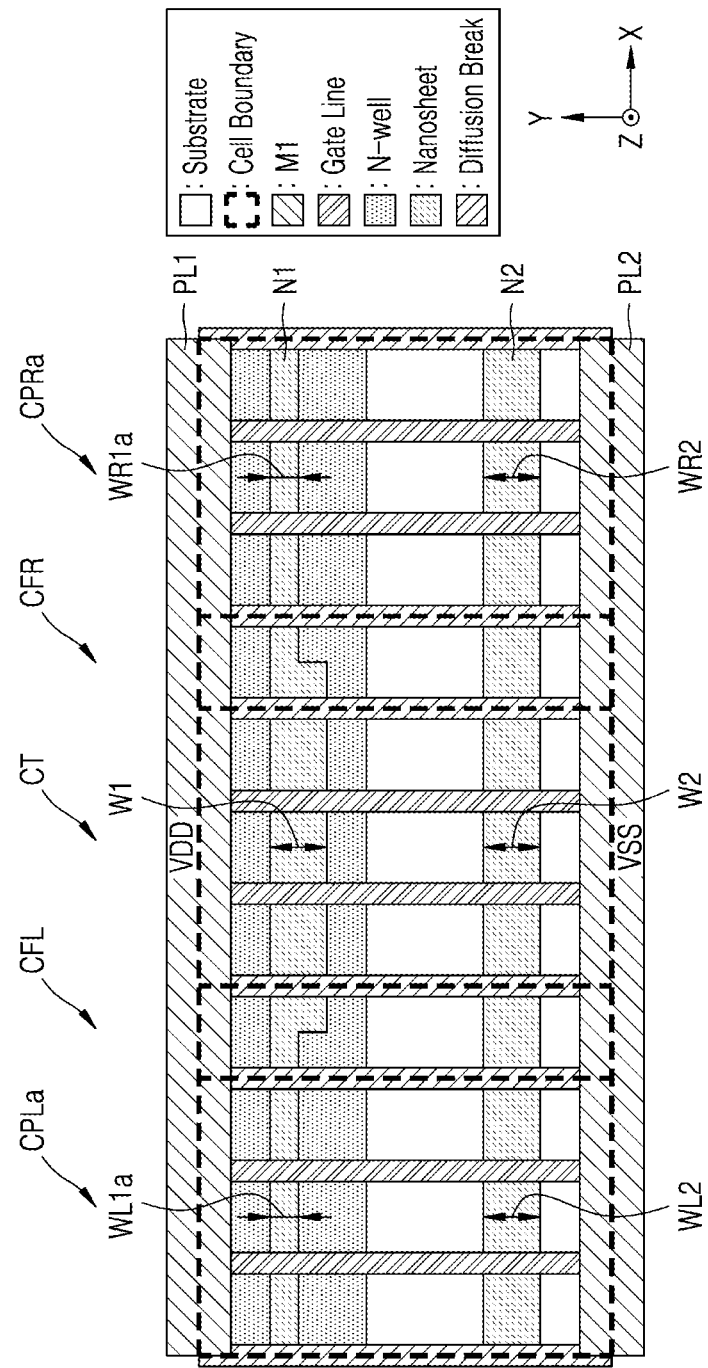

FIG. 8A is a plan view illustrating cells CT, CPRa, and CPLa included in an integrated circuit according to an example embodiment of the inventive concept and further illustrates example embodiments of block S420 of FIG. 2. FIG. 8B is a plan view illustrating cells CT, CPRa, CFR, CFL and CPLa included in an integrated circuit according to an example embodiment of the inventive concept and further illustrates example embodiments of block S450 of FIG. 2. In the description of FIGS. 8A and 8B, duplicate description with respect to the same reference numerals as those of FIG. 3 will be omitted.

Referring to FIG. 8A, in the P&R operation (e.g., S200 of FIG. 1), the target cell CT may be placed, a first neighboring cell CPRa may be placed to be adjacent to the target cell CT in the +X direction from the target cell CT, and the second neighboring cell CPLa may be placed to be adjacent to the target cell CT in the −X direction from the target cell CT. The first nanosheet N1 included in the first neighboring cell CPRa may extend in the X-axis direction with a first width WR1a in the Y-axis direction, and the first nanosheet N1 included in the second neighboring cell CPLa may extend in the X-axis direction with a first width WR1a in the Y-axis direction.

In an example embodiment, the first width W1 of the first nanosheet N1 of the target cell CT may be different from the first width WR1a of the first nanosheet N1 of the first neighboring cell CPRa. In an example embodiment, the first width W1 of the first nanosheet N1 of the target cell CT may be different from the first width WL1a of the first nanosheet N1 of the second neighboring cell CPLa. For example, the first width WR1a of the first nanosheet N1 of the first neighboring cell CPRa and the first width WL1a of the first nanosheet N1 of the second neighboring cell CPLa may be less than the second width W2 of the second nanosheet N2 of the target cell CT. The jog pattern may be formed in the first nanosheet N1 in the adjacent region where the target cell CT and the first neighboring cell CPRa are adjacent to each other and in the adjacent region where the target cell CT and the second neighboring cell CPLa are adjacent to each other. However, embodiments of the inventive concept are not limited thereto, and the first width WR1a of the first nanosheet N1 of the first neighboring cell CPRa may be greater than the first width W1 of the first nanosheet N1 of the target cell CT, and the first width WL1a of the first nanosheet N1 of the second neighboring cell CPLa may be greater than the first width W1 of the first nanosheet N1 of the target cell CT.

Referring to FIGS. 4 and 8A, the process variation may occur in the target cell CT due to the first neighboring cell CPRa and the second neighboring cell CPLa to be adjacently placed, in which the target cell CT is included in the timing critical path among the standard cells to be placed in the P&R operation of block S200. Accordingly, the method of manufacturing the integrated circuit according to some embodiments of the inventive concept may include the re-performing P&R (S400), based on the shapes of the first nanosheet Ni and the second nanosheet N2 included in the target cell CT, the first neighboring cell CPRa, and the second neighboring cell CPLa. For example, when the first neighboring cell CPRa is not included in the timing critical path, the first neighboring cell CPRa may be substituted with the first neighboring cell CPR of FIG. 3 (S440). In addition, when the second neighboring cell CPLa is not included in the timing critical path, the second neighboring cell CPLa may be substituted with the second neighboring cell CPL of FIG. 3 (S440).

By substituting the first neighboring cell CPRa and the second neighboring cell CPLa of FIG. 8A with the first neighboring cell CPR and the second neighboring cell CPL of FIG. 3 respectively, the first width W1 of the first nanosheet N1 of the target cell CT and the first width WR1 of the first nanosheet N1 of the first neighboring cell CPR may be equal to each other, and the first width W1 of the first nanosheet N1 of the target cell CT and the first width WL1 of the first nanosheet N1 of the second neighboring cell CPL may be equal to each other. Therefore, the change of the delay due to the process variation associated with the target cell CT may be reduced.

However, embodiments of the inventive concept are not limited thereto, and when the second width W2 of the second nanosheet N2 of the target cell CT is different from the second width WR2 of the second nanosheet N2 of the first neighboring cell CPRa and the first neighboring cell CPRa is not included in the timing critical path, the first neighboring cell CPRa of FIG. 8A may be substituted with the first neighboring cell CPR of FIG. 3 (S440). In addition, even when the second width W2 of the second nanosheet N2 of the target cell CT is different from the second width WL2 of the second nanosheet N2 of the second neighboring cell CPLa and the second neighboring cell CPLa is not included in the timing critical path, the second neighboring cell CPLa of FIG. 8A may be substituted with the second neighboring cell CPL of FIG. 3 (S440). Referring to FIGS. 4, 8A, and 8B, when the shapes of the nanosheets N1 and N2 of the first neighboring cell CPRa and the shapes of the nanosheets N1 and N2 of the target cell CT are different from each other and the first neighboring cell CPRa is included in the timing critical path, a first filler cell CFR may be inserted between the target cell CT and the first neighboring cell CPRa (S450). In addition, when the shapes of the nanosheets N1 and N2 of the second neighboring cell CPLa and the shapes of the nanosheets N1 and N2 of the target cell CT are different from each other and the second neighboring cell CPLa is included in the timing critical path, a second filler cell CFL may be inserted between the target cell CT and the second neighboring cell CPLa (S450).

The first filler cell CFR may have the same width as the first width W1 of the first nanosheet N1 of the target cell CT in the region adjacent to the target cell CT and may include the first nanosheet N1 having the same width as the first width WR1a of the first nanosheet N1 of the first neighboring cell CPRa in the region adjacent to the first neighboring cell CPRa. The second filler cell CFL may have the same width as the first width W1 of the first nanosheet N1 of the target cell CT in the region adjacent to the target cell CT and may include the first nanosheet N1 having the same width as the first width WL1a of the first nanosheet N1 of the second neighboring cell CPLa in the region adjacent to the second neighboring cell CPLa. That is, the jog pattern may be formed in the first nanosheet N1 in the first filler cell CFR and the second filler cell CFL.

However, embodiments of the inventive concept are not limited thereto, and when the second width W2 of the second nanosheet N2 of the target cell CT is different from the second width WR2 of the second nanosheet N2 of the first neighboring cell CPRa and the first neighboring cell CPRa is included in the timing critical path, the first filler cell CFR may be inserted between the target cell CT and the first neighboring cell CPRa (S450). In such embodiments, the first filler cell may include the second nanosheet N2 where the jog pattern is formed therein. In addition, when the second width W2 of the second nanosheet N2 of the target cell CT is different from the second width WL2 of the second nanosheet N2 of the second neighboring cell CPLa and the second neighboring cell CPLa is included in the timing critical path, the second filler cell CFL may be inserted between the target cell CT and the second neighboring cell CPLa (S450). In such embodiments, the second filler cell may include the second nanosheet N2 where the jog pattern is formed therein.

Figure 9:
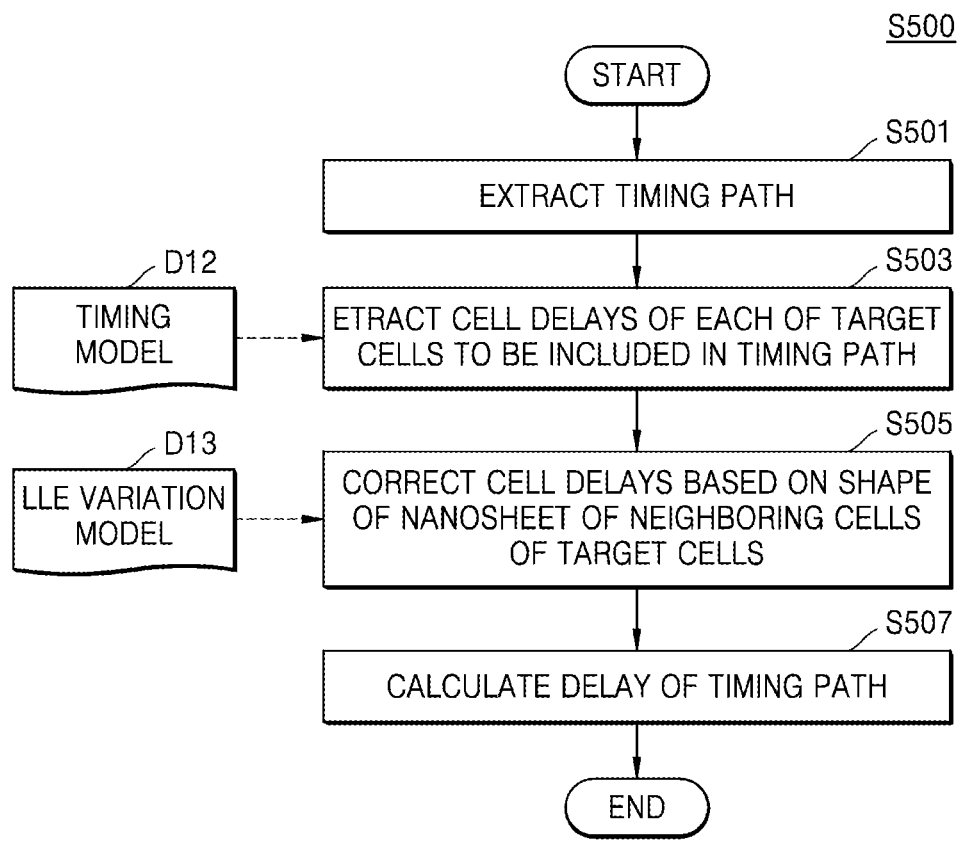
FIG. 9 is a flowchart illustrating a method of designing an integrated circuit, according to some example embodiments of the inventive concept.
Figure 10:
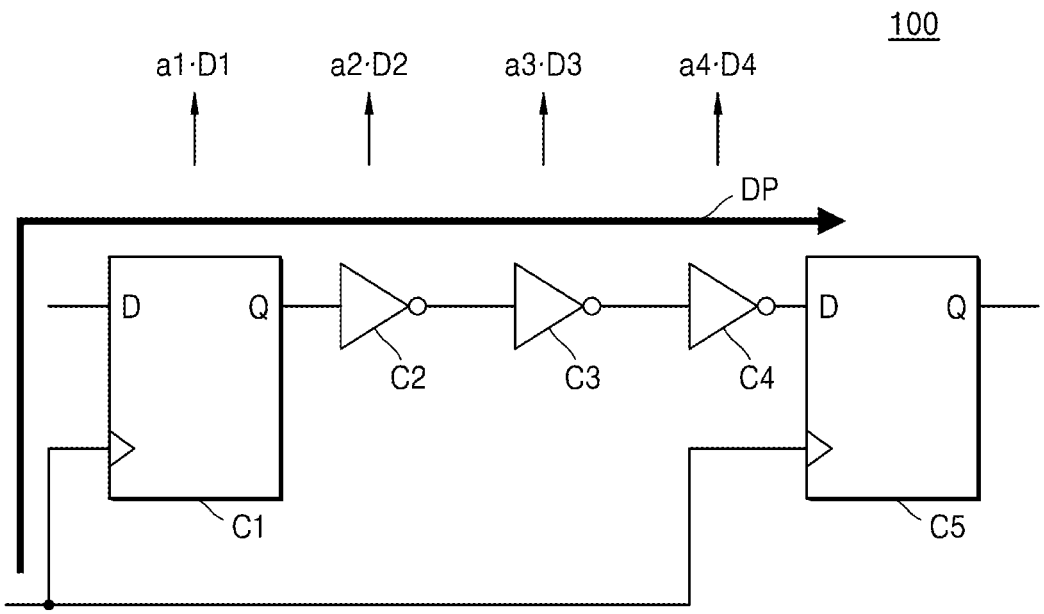
FIG. 10 is a diagram illustrating an integrated circuit according to some example embodiments of the inventive concept.

FIG. 9 is a flowchart illustrating a method of designing an integrated circuit, according to some example embodiment of the inventive concept, and further illustrates example embodiments of block S500 of FIG. 1. FIG. 10 is a diagram illustrating an integrated circuit according to some example embodiments of the inventive concept, and further illustrates example embodiments of the flowchart S500 of FIG. 9. The flowchart S500 of FIG. 9 may include blocks S501 to S507. For example, operations of the flowchart S500 may be performed by the processor by using the STA tool.

Referring to FIGS. 9 and 10, at block S501, the timing path may be extracted from a plurality of the placed standard cells. For example, a plurality of timing paths may include a data path DP, a clock path, and the like. At block S501, the data path DP may be selected. Although embodiments of the inventive concept are described with respect to selection of the data path DP, it will be understood that such embodiments may also be equally applied to the clock path.

For example, the integrated circuit may include first to fifth cells C1 to C5, and the data path DP may be defined as the timing path from a clock pin of the first cell C1, which is a launch flip-flop, to a data input pin of the fifth cell C5, which is a capture flip-flop. In FIG. 10, for convenience of description, the second to fourth cells C2 to C4 are shown as inverters, but the second to fourth cells C2 to C4 may be implemented with various types of logic gates in accordance with different embodiments of the inventive concept. In addition, although FIG. 10 illustrates four cells, the first to fourth cells C1 to C4, are included in the data path DP, embodiments of the inventive concept are not limited thereto, and the number of cells included in the data path DP may be different in various embodiment of the inventive concept.

At block S503, cell delays of each of the target cells to be included in the timing path may be extracted by using a timing model D12. For example, delays of each of the first to fourth cells C1 to C4 included in the data path DP, that is, a first delay D1, a second delay D2, a third delay D3, and a fourth delay D4 may be extracted.

In an example embodiment, the timing model D12 may include timing characteristic information of each of the standard cells and may include timing characteristic information reflecting the LLE by neighboring cells to be placed adjacent to each of the standard cells. For example, the timing model D12 may be generated by extracting a spice netlist from a layout of the standard cell and extracting the timing characteristic of the standard cell (e.g., delay characteristics, capacitance of an input/output, etc.) by using a simulation tool. Specifically, the timing model D12 may be generated from the layout including the standard cell and a dummy wiring structure (e.g., back-end-of-line (BEOL), front-end-of-line (FEOL)) around the standard cell, and, therefore, the timing model D12 may reflect the LLE of the standard cell by the dummy wiring structure.

At block S505, by using an LLE variation model D13, the cell delays of each of the target cells may be corrected based on the shapes of the nanosheets of neighboring cells of the target cells. In an example embodiment, the LLE variation model D13 may include a correction factor (e.g., a derating factor) of the cell delay of the standard cell according to the shape of the nanosheet of the neighboring cell to be placed adjacent to the standard cell. At block S505, the correction factor corresponding to each of the target cells may be obtained from the LLE variation model D13, and cell delays of each of the target cells may be corrected by using the obtained correction factor. For example, the first to fourth correction factors a1 to a4 corresponding to each of the first to fourth cells C1 to C4 included in the data path DP may be obtained by using the LLE variation model D13. By using the first to fourth correction factors a1 to a4, delays of each of the first to fourth cells C1 to C4 included in the data path DP may be corrected, and the corrected first delay a1·D1, the corrected second delay a2·D2, the corrected third delay a3·D3, and the corrected fourth delay a4·D4 may be extracted.

In an example embodiment, when the width of the nanosheet of the standard cell and the width of the nanosheet of the neighboring cell are the same, the correction factor may be 1, and as the difference between the width of the nanosheet of the standard cell and the width of the nanosheet of the neighboring cell may increase, the correction factor may decrease and may be farther from 1. When the shape of the nanosheet of the target cell is different from the shape of the nanosheet of the neighboring cell to be placed adjacent to the target cell, the cell delay of the target cell may be different from the cell delay extracted at block S503 due to the process variation. Accordingly, by using the LLE variation model D13, cell delays of each of the target cells may be corrected based on the shapes of the nanosheet of the target cells and the neighboring cells.

At block S507, the delay of the timing path may be calculated by using the corrected cell delays of each of the target cells. In an example embodiment, the delay of the timing path may be calculated by summing the corrected cell delays of each of the target cells. For example, the delay of the data path DP may be calculated by summing the corrected first delay a1·D1, the corrected second delay a2·D2, the corrected third delay a3·D3, and the corrected fourth delay a4·D4. The method of manufacturing the integrated circuit, according to some embodiments of the inventive concept, may correct the delay of each of the target cells based on the shapes of the nanosheets of the target cells and the neighboring cells included in the timing path, thereby more accurately extracting the delay of the timing path. Accordingly, the timing analysis of the integrated circuit may be more accurate.

FIGS. 11A and 11B are diagrams illustrating the LLE variation model D13 of FIG. 9 according to some example embodiments of the inventive concept.

Referring to FIG. 11A, the LLE variation model D13 may include a first lookup table D13a. The first lookup table D13a may include information with respect to cell delay correction factors a11 to a14, a21 to a24, a31 to a34, and a41 to a44 of the standard cells according to the types of the neighboring cell to be placed adjacent to a specific standard cell. For example, the first lookup table D13a may include information about correction factors a11 to a14, a21 to a24, a31 to a34, and a41 to a44 that may vary based on the first neighboring cells and the second neighboring cells, in which the first neighboring cells are placed adjacent to a right side (e.g., +X direction) of the specific standard cell and the second neighboring cells are placed adjacent to a left side (e.g., −X direction) of the specific standard cell. Each of the first neighboring cells included in the first lookup table D13a may include nanosheets having different shapes, and each of the second neighboring cells included in the first lookup table D13a may include nanosheets having different shapes.

Referring to FIG. 11B, the LLE variation model D13 may include a second lookup table D13b. The second lookup table D13b may include information about cell delay correction factors a11 to a14, a21 to a24, a31 to a34, and a41 to a44 of the standard cells according to the nanosheets of the neighboring cell to be placed adjacent to the specific standard cell. For example, the second lookup table D13b may include information about correction factors a11' to a14', a21' to a24', a31' to a34', and a41' to a44' that may vary depending on widths of the nanosheets of the first neighboring cells and the second neighboring cells, in which the first neighboring cells are placed adjacent to the right side (e.g., +X direction) of the specific standard cell and the second neighboring cells are placed adjacent to the left side (e.g., −X direction) of the specific standard cell.

Referring to FIGS. 11A and 11B, the method of manufacturing the integrated circuit, according to some embodiments of the inventive concept, may correct cell delays of each of the target cells included in the timing path by using at least one of the first lookup table D13a and the second lookup table D13b. Thus, the delay of the timing path may be extracted more accurately, and the timing analysis of the integrated circuit may be more accurate.

Figure 12:
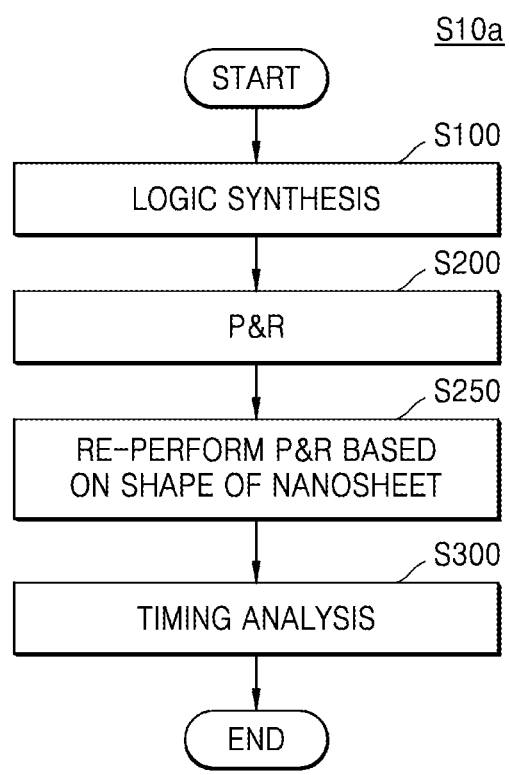
FIG. 12 is a flowchart illustrating a method of designing an integrated circuit, according to some example embodiments of the inventive concept.

FIG. 12 is a flowchart illustrating a method of designing an integrated circuit, according to some example embodiments of the inventive concept. Flowchart S10a of FIG. 12 may include block S100, block S200, block S250, and block S300. In the description of FIG. 12, duplicate description with respect to the same reference numerals as those of FIG. 1 will be omitted.

Referring to FIG. 12, at block S100, a synthesis operation may be performed, and at block S200, standard cells that define the integrated circuit may be P&R. After performing the operations of block S200, at block S250, the P&R may be re-performed based on the shape of the nanosheet included in the standard cells. For example, block S250 may be performed by the processor by using the P&R tool.

In an example embodiment, at block S250, the standard cell included in the clock path among the standard cells placed at block S200 may be extracted as the target cell, and the shape of the nanosheet of the target cell and the shape of the nanosheet of the neighboring cell to be placed adjacent to the target cell may be compared. The filler cell may be inserted between the target cell and the neighboring cell according to a result of the comparison. Example operations of block S250 will be described in detail with reference to FIG. 13.

At block S300, the timing analysis of the integrated circuit may be performed, and a result of the analysis may be generated as timing analysis data. The timing analysis may be performed based on layout data generated according to the re-performed P&R. In an example embodiment, block S300 may include block S500 of FIG. 9. In an example embodiment, after performing the operations of block S300, the operations of block S400 of FIGS. 1 and 4 may be further performed.

The method of manufacturing the integrated circuit, according to some embodiments of the inventive concept, may reduce process variations that may occur based on the shape of the nanosheet by re-performing the P&R operation based on the shape of the nanosheet included in the standard cells. Accordingly, the probability of violating the timing constraints of the integrated circuit may be reduced and, thus, the timing characteristics may be improved.

Figure 13:
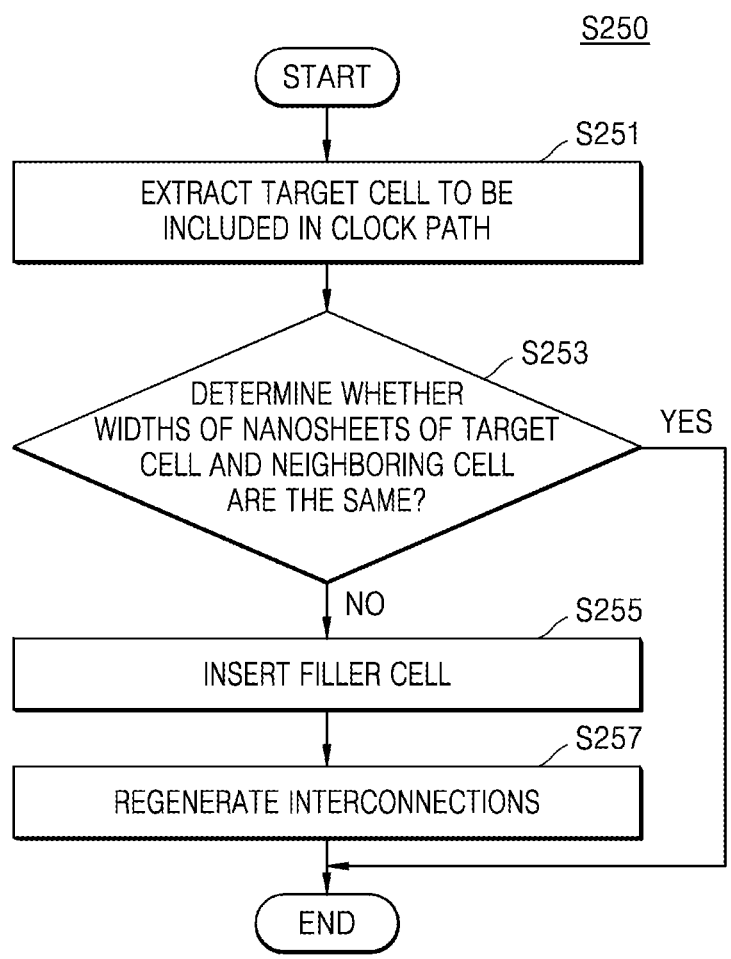
FIG. 13 is a flowchart illustrating a method of designing an integrated circuit, according to some example embodiments of the inventive concept.

FIG. 13 is a flowchart illustrating a method of designing an integrated circuit, according to some example embodiments of the inventive concept, and further illustrates example embodiments of block S250 of FIG. 12. Step S250 of FIG. 13 may include steps S251 to S257.

Referring to FIG. 13, at block S251, the target cell included in the clock path may be extracted. For example, the clock path may be extracted by using the layout data generated at block S200 of FIG. 12, and the target cell included in the clock path may be extracted.

At block S253, the widths of the nanosheets of the extracted target cells and the neighboring cells to be placed adjacent to the target cells may be compared. For example, the width of the nanosheet of the first neighboring cell which may be placed adjacent to the target cell in the +X direction and the width of the nanosheet of the target cell may be compared, and the width of the nanosheet of the second neighboring cell which may be placed adjacent to the target cell in the −X direction and the width of the nanosheet of the target cell may be compared. When the widths of the nanosheets of the extracted target cell and the neighboring cell to be placed adjacent to the target cell are the same, the operations of block S253 may be terminated and the operations of block S300 of FIG. 12 may be performed.

When the widths of the nanosheets of the extracted target cell and the neighboring cell to be placed adjacent to the target cell are different, the filler cell may be inserted between the target cell and the neighboring cell at block S255. For example, when the width of the nanosheet of the first neighboring cell to be placed adjacent to the target cell in the +X direction and the width of the nanosheet of the target cell are different from each other, the filler cell (e.g., one of the CF of FIG. 6, the CFb of FIG. 7B, and the CFR of FIG. 8B) may be inserted between the target cell and the first neighboring cell. In addition, for example, when the width of the nanosheet of the second neighboring cell to be placed adjacent to the target cell in the −X direction and the width of the nanosheet of the target cell are different from each other, the filler cell (e.g., the CFL of FIG. 8B) may be inserted between the target cell and the second neighboring cell.

At block S460, the interconnections may be regenerated according to the arrangement of the changed standard cells. The layout data may be regenerated as the interconnections are regenerated.

Figure 14:
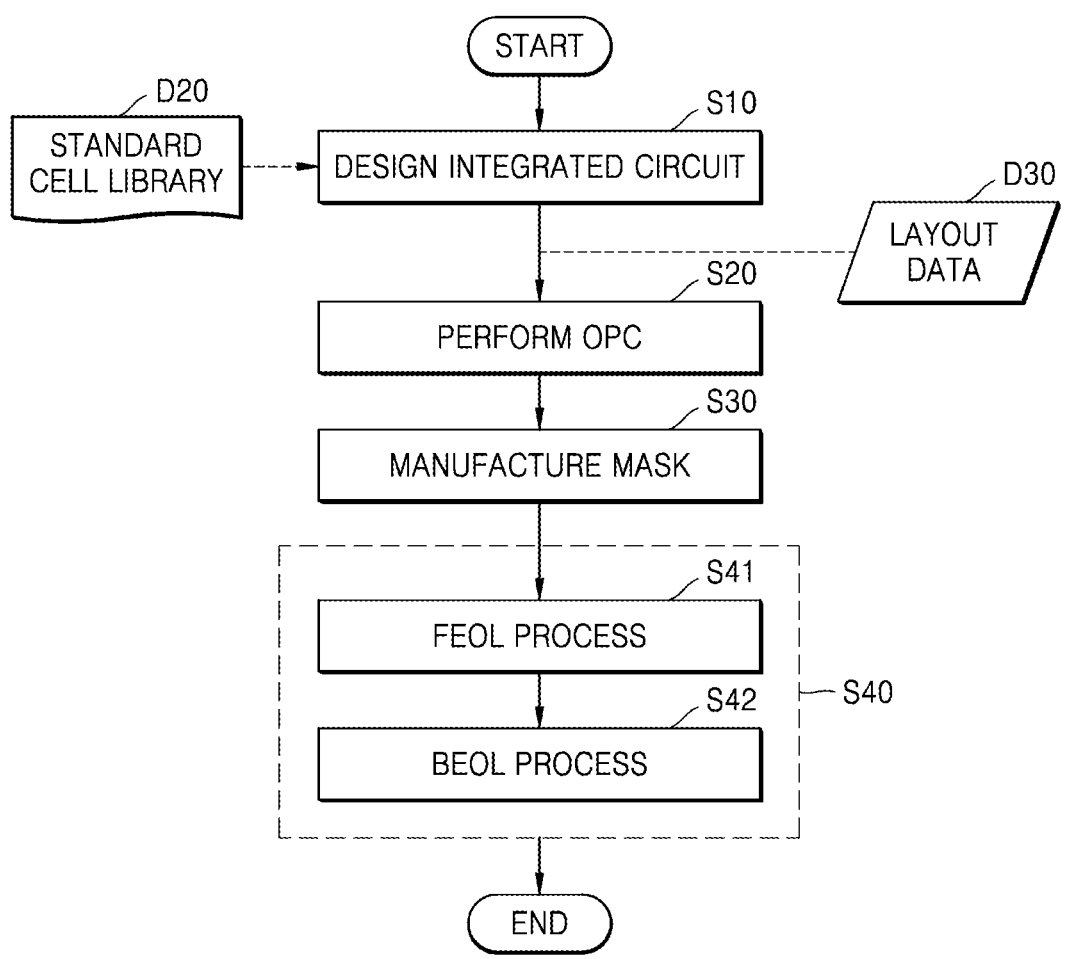
FIG. 14 is a flowchart illustrating a method of manufacturing an integrated circuit, according to some example embodiments of the inventive concept.

FIG. 14 is a flowchart illustrating a method of manufacturing an integrated circuit, according to some example embodiments of the inventive concept.

The standard cell library D20 may include information about a plurality of standard cells, for example, function information, characteristic information, layout information, and the like. For example, the information about the standard cells CT, CPR, and CPL of FIG. 3, the first neighboring cell CPRa of FIG. 5A, the filler cell CF of FIG. 6, the first neighboring cell CPRb of FIG. 7A, the filler cell CFb of FIG. 8, the second neighboring cell CPLa of FIG. 8A, and the filler cells CFR and CFL of FIG. 8 may be included.

Referring to FIG. 14, at block S10 (flowchart S10 of FIG. 1), an operation of designing the integrated circuit may be performed, and layout data D30 may be generated. For example, such operations may be performed in the processor by using a tool for designing the integrated circuit. In an example embodiment, block S10 of FIG. 14 may include at least one of operation of the flowchart S10 of FIG. 1 and the flowchart S10a of FIG. 12.

At block S20, optical proximity correction (OPC) may be performed. The OPC may refer to an operation for forming a pattern of a desired shape by correcting distortion phenomena, such as refraction, due to light characteristics in a photolithography process, which is included in a semiconductor process for manufacturing the integrated circuit, and a pattern on a mask may be determined by applying the OPC to the layout data D30.

At block S30, an operation of manufacturing the mask may be performed. For example, patterns to be formed in a plurality of layers may be defined according to the layout data D30, and at least one mask (or photomask) for forming patterns of each of the plurality of layers may be manufactured.

At block S40, an operation of fabricating the integrated circuit may be performed. For example, the integrated circuit may be manufactured by patterning a plurality of layers by using at least one mask fabricated at block S30. Block S40 may include operations of block S41 and block S42.

At block S41, an FEOL process may be performed. The FEOL process may refer to a process of forming individual devices, for example, transistors, capacitors, resistors, and the like, on a substrate in the process of fabricating the integrated circuit. For example, the FEOL process may include operations of planarizing and cleaning a wafer, forming a trench, forming a well, forming a gate line, and forming a source and drain, and the like.

At block S42, a BEOL process may be performed. The BEOL process may refer to a process of interconnecting individual devices, for example, transistors, capacitors, resistors, and the like, in the process of fabricating the integrated circuit. For example, the BEOL process may include silicidation of a gate, source and drain regions, adding dielectrics, planarization, forming holes, adding metal layers, forming vias, forming passivation layers, and the like. Hereafter, the integrated circuit may be packaged in a semiconductor package and may be used as part of various applications.

Figure 15:
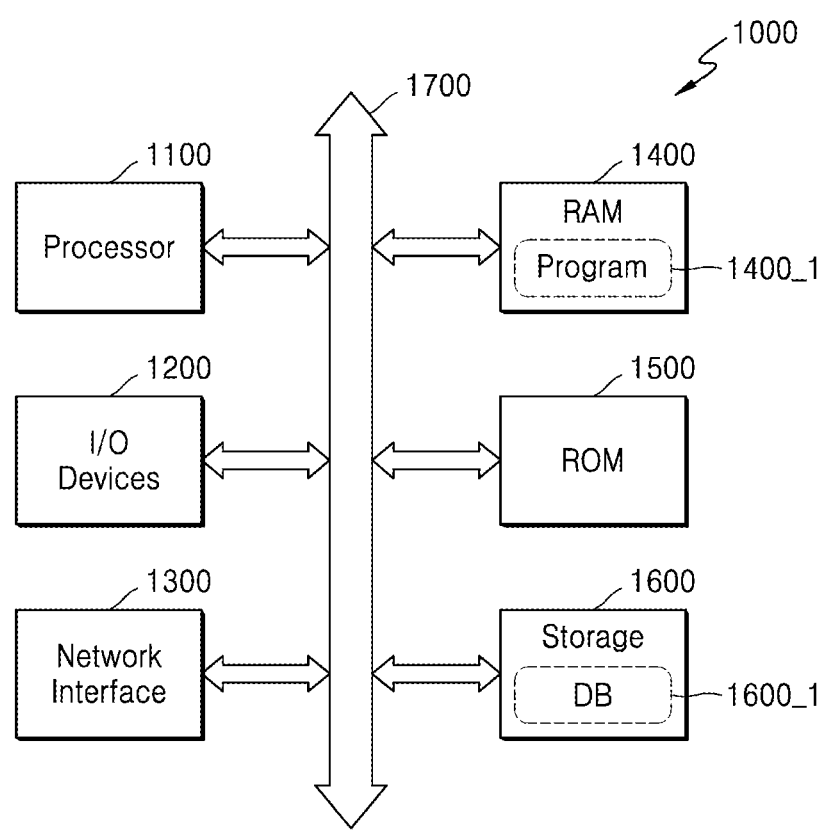
FIG. 15 is a block diagram of a computing system including a memory for storing a program according to some example embodiments of the inventive concept.

FIG. 15 is a block diagram of a computing system 1000 including a memory for storing a program according to some example embodiments of the inventive concept. According to an example embodiment of the inventive concept, the flowchart S10 of FIG. 1 and the flowchart S10a of FIG. 11, which are operations of designing the integrated circuit, may be performed by the computing system 1000.

The computing system 1000 may include a fixed computing system, such as a desktop computer, a workstation, a server, or the like, or may be a portable computing system such as a laptop computer. As shown in FIG. 15, the computing system 1000 may include a central processing unit (CPU) 1100, input/output devices 1200, a network interface 1300, random access memory (RAM) 1400, read only memory (ROM) 1500, and a storage device 1600. The CPU 1100, the input/output devices 1200, the network interface 1300, the RAM 1400, the ROM 1500, and the storage device 1600 may be connected to a bus 1700, and may communicate with each other through the bus 1700.

The CPU 1100 may be referred to as a processing unit and may include a core capable of executing any instruction set (e.g., Intel Architecture-32 (IA-32), 64-bit extension IA-32, x86-64, Power PC, Sparc, MIPS, ARM, IA-64, etc.), such as a micro-processor, an application processor (AP), a digital signal processor (DSP), or a graphics processing unit (GPU). For example, the CPU 1100 may access a memory, such as the RAM 1400 or the ROM 1500, via the bus 1700 and may execute instructions stored in the RAM 1400 or the ROM 1500. As shown in FIG. 15, the RAM 1400 may store a program 1400_1 or at least a portion thereof according to some example embodiments of the inventive concept, and the program 1400_1 may cause the CPU 1100 to perform one or more operations for designing the integrated circuit. That is, the program 1400_1 may include a plurality of instructions executable by the CPU 1100, and the plurality of instructions included in the program 1400_1 may cause the CPU 1100 to perform operations for designing the integrated circuit according to example embodiments of the inventive concept.

The storage device 1600 may not lose the stored data even when the power to be supplied to the computing system 1000 is cut off. For example, the storage device 1600 may include a non-volatile memory, such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), and ferroelectric random access memory (FRAM), and may also include a storage medium such as magnetic tape, an optical disk, and a magnetic disk. In addition, the storage device 1600 may be removable from the computing system 1000.

The storage device 1600 may store the program 1400_1, and the program 1400_1 or at least a portion thereof from the storage device 1600 may be loaded into the RAM 1400 before the program 1400_1 is executed by the CPU 1100. The storage device 1600 may store a file written in a program language, and the program 1400_1 or at least a portion thereof generated by a compiler or the like may be loaded into the RAM 1400.

The storage device 1600 may store data to be processed by the CPU 1100 or data processed by the CPU 1100. That is, the CPU 1100 may generate new data by processing data stored in the storage device 1600 according to the program 1400_1 and may store the generated data in the storage device 1600. For example, the storage device 1600 may store the timing analysis data D11 of FIG. 1, which is processed by the program 1400_1, and may store the layout data D30 of FIG. 14, which is generated by the program 1400_1.

The storage device 1600 may store a database 1600_1, and the database 1600_1 may include information used to design the integrated circuit. For example, the database 1600_1 may include the timing model D12 of FIG. 9, the LLE variation model D13 of FIG. 9, the first lookup table D13a of FIG. 11A, the second lookup table D13b of FIG. 11B, and the cell library D20 of FIG. 14.

The input/output devices 1200 may include an input device, such as a keyboard, a pointing device, or the like, and may include an output device, such as a display device, a printer, or the like. For example, a user may trigger or cause execution of the program 1400_1 by the CPU 1100 through the input/output devices 1200, and may check the timing analysis data D11 of FIG. 1, the layout data D30 of FIG. 14, and/or an error message.

The network interface 1300 may provide access to a network outside or external to the computing system 1000. For example, the network may include a number of computing systems and communication links, in which the communication links may include wired links, optical links, wireless links, or any other type of links. The timing analysis data D11 of FIG. 1 and/or the layout data D30 of FIG. 14 may be provided to other computing systems through the network interface 1300.

While the inventive concept has been particularly shown and described with reference to embodiments thereof, it will be understood that various changes in form and details may be made therein without departing from the spirit and scope of the following claims.

What is claimed is:

1. A method of manufacturing an integrated circuit, comprising:
   generating layout data of the integrated circuit by placing and routing standard cells that define the integrated circuit, the standard cells comprising a nanosheet;
   generating timing analysis data by performing a timing analysis of the integrated circuit using the layout data; and
   regenerating the layout data of the integrated circuit by replacing and rerouting the standard cells that define the integrated circuit based on the timing analysis data and a shape of the nanosheet of the placed standard cells,
   wherein the regenerating the layout data of the integrated circuit further comprises:
   extracting a target cell of the standard cells included in a timing critical path based on the timing analysis data; and
   when widths of the nanosheet in adjacent regions of the target cell and a neighboring cell of the standard cells placed adjacent to the target cell, respectively, are different from each other, regenerating the layout data of the integrated circuit by replacing and rerouting the standard cells.

2. The method of manufacturing an integrated circuit of claim 1, wherein the regenerating the layout data of the integrated circuit further comprises:
   when a width of the nanosheet in the target cell and a width of the nanosheet in the neighboring cell of the standard cells placed adjacent to the target cell are different from each other, inserting a filler cell between the target cell and the neighboring cell.

3. The method of manufacturing an integrated circuit of claim 2, wherein a first width of the nanosheet in the filler cell is equal to that of the nanosheet in the target cell in a first region of the filler cell placed adjacent to the target cell and a second width of the nanosheet in the filler cell is equal to that of the nanosheet in the neighboring cell in a second region of the filler cell placed adjacent to the neighboring cell.

4. The method of manufacturing an integrated circuit of claim 2, wherein the inserting the filler cell comprises:
   determining whether the neighboring cell is included in a critical path; and
   when the neighboring cell is included in the critical path, inserting the filler cell.

5. The method of manufacturing an integrated circuit of claim 1, wherein the regenerating the layout data of the integrated circuit further comprises:
   when widths of the nanosheet in adjacent regions of the target cell and a neighboring cell of the standard cells placed adjacent to the target cell, respectively, are different from each other, substituting, for the neighboring cell, one of the standard cells that performs a same function as the neighboring cell and has a substitute nanosheet having a same width as the nanosheet in the adjacent region of the target cell.

6. The method of manufacturing an integrated circuit of claim 1, further comprising, after regenerating the layout data of the integrated circuit, re-performing the timing analysis of the integrated circuit using the regenerated layout data.

7. The method of manufacturing an integrated circuit of claim 6, wherein the re-performing the timing analysis comprises:
extracting a timing path using the regenerated layout data;
extracting cell delays of each of the standard cells included in the timing path;
correcting the cell delays based on the shape of the nanosheet in ones of the standard cells placed adjacent to the standard cells included in the timing path; and
calculating a delay of the timing path by summing the corrected cell delays.

8. The method of manufacturing an integrated circuit of claim 7, wherein the correcting the cell delays comprises obtaining correction factors corresponding to each of the standard cells included in the timing path through a local layout effect (LLE) variation model;
and correcting the cell delays by using the obtained correction factors.

9. The method of manufacturing an integrated circuit of claim 8, wherein the LLE variation model comprises a first lookup table that comprises information with respect to cell delay correction factors of a specific standard cell according to a type of a neighboring cell placed adjacent to the specific standard cell, and
wherein the correction factors are obtained from the first lookup table.

10. The method of manufacturing an integrated circuit of claim 8, wherein the LLE variation model comprises a second lookup table that comprises information with respect to cell delay correction factors of a specific standard cell according to a width of the nanosheet in a neighboring cell placed adjacent to the specific standard cell, and
wherein the correction factors are obtained from the second lookup table.

11. A method of manufacturing an integrated circuit, comprising:
generating layout data of the integrated circuit by placing and routing standard cells that define the integrated circuit, the standard cells comprising a nanosheet;
extracting a target cell of the standard cells included in a clock path based on the layout data; and
regenerating the layout data of the integrated circuit by replacing and rerouting the standard cells that define the integrated circuit based on shapes of the nanosheet in the target cell and in a neighboring cell of the standard cells placed adjacent to the target cell, respectively,
wherein the regenerating the layout data of the integrated circuit further comprises:
when a width of the nanosheet in the target cell and a width of the nanosheet in the neighboring cell placed adjacent to the target cell are different from each other, regenerating the layout data of the integrated circuit by replacing and rerouting the standard cells.

12. The method of manufacturing an integrated circuit of claim 11, wherein the regenerating the layout data of the integrated circuit further comprises:
when a width of the nanosheet in the target cell and a width of the nanosheet in the neighboring cell placed adjacent to the target cell are different from each other, inserting a filler cell between the target cell and the neighboring cell.

13. The method of manufacturing an integrated circuit of claim 12, wherein a first width of the nanosheet in the filler cell is equal to that of the nanosheet in the target cell in a first region of the filler cell placed adjacent to the target cell, and a second width of the nanosheet in the filler cell is equal to that of the nanosheet in the neighboring cell in a second region of the filler cell placed adjacent to the neighboring cell.

14. The method of manufacturing an integrated circuit of claim 11, further comprising, after regenerating the layout data of the integrated circuit, generating timing analysis data by performing a timing analysis of the integrated circuit using the regenerated layout data.

15. The method of manufacturing an integrated circuit of claim 14, wherein the performing the timing analysis comprises:
extracting a timing path using the regenerated layout data;
extracting cell delays of each of the standard cells included in the timing path;
correcting the cell delays based on a shape of the nanosheet in ones of the standard cells placed adjacent to the standard cells included in the timing path; and
calculating a delay of the timing path by summing the corrected cell delays.

16. A computing system for manufacturing an integrated circuit, the computing system comprising:
a processor; and
a memory coupled to the processor and comprising computer readable program code embodied in the memory that is executable by the processor to perform operations comprising:
generating, using a standard cell library, layout data of the integrated circuit by placing and routing standard cells that define the integrated circuit, the standard cells comprising a nanosheet;
generating timing analysis data by performing a timing analysis of the integrated circuit using the layout data;
regenerating the layout data of the integrated circuit by replacing and rerouting the standard cells that define the integrated circuit based on the timing analysis data and a shape of the nanosheet of the placed standard cells; and
re-performing the timing analysis of the integrated circuit using the regenerated layout data,
wherein re-performing the timing analysis of the integrated circuit comprises:
extracting a timing path using the regenerated layout data;
extracting cell delays of each of standard cells included in the timing path;
correcting the cell delays based on a shape of the nanosheet in ones of the standard cells placed adjacent to the standard cells included in the timing path; and
calculating a delay of the timing path by summing the corrected cell delays.

17. The computing system of claim 16, wherein the operations further comprise re-arranging the standard cells that define the integrated circuit,
wherein re-arranging the standard cells comprises:
extracting a target cell of the standard cells included in a timing critical path based on the timing analysis data; and
inserting a filler cell between the target cell and a neighboring cell of the standard cells placed adjacent to the target cell by using the standard cell library when a width of the nanosheet in the target cell and a width of the nanosheet in the neighboring cell are different from each other.

18. The computing system of claim 16, wherein the operations further comprise re-arranging the standard cells that define the integrated circuit,
wherein re-arranging the standard cells comprises:

extracting a target cell of the standard cells included in a timing critical path based on the timing analysis data; and when widths of the nanosheet in adjacent regions of the target cell and a neighboring cell of the standard cells placed adjacent to the target cell, respectively, are different from each other, substituting for the neighboring cell, one of the standard cells that performs a same function as the neighboring cell and has a substitute nanosheet having a same width as the nanosheet in the adjacent region of the target cell.

19. The computing system of claim 16, further comprising a local layout effect (LLE) variation model stored in the memory and comprising at least one of a first lookup table and a second lookup table, the operations further comprising:

correcting the cell delays by using the LLE variation model, wherein the first lookup table comprises information with respect to cell delay correction factors of a specific standard cell according to a type of a neighboring cell placed adjacent to the specific standard cell, and wherein the second lookup table comprises information with respect to cell delay correction factors of the specific standard cell according to a width of the nanosheet in the neighboring cell placed adjacent to the specific standard cell.

20. The method of manufacturing an integrated circuit of claim 15, wherein the correcting the cell delays comprises obtaining correction factors corresponding to each of the standard cells included in the timing path through a local layout effect (LLE) variation model;

and correcting the cell delays by using the obtained correction factors.

* * * * *